(12) United States Patent
Kong et al.

(10) Patent No.: US 7,561,942 B2
(45) Date of Patent: Jul. 14, 2009

(54) APPARATUS AND METHOD OF CONTROLLING MOBILE BODY

(75) Inventors: Donggeon Kong, Yongin-si (KR); Changkyu Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 721 days.

(21) Appl. No.: 11/208,849

(22) Filed: Aug. 23, 2005

(65) Prior Publication Data

US 2006/0167588 A1 Jul. 27, 2006

(30) Foreign Application Priority Data

Jan. 26, 2005 (KR) ................... 10-2005-0007236

(51) Int. Cl.
*G06F 19/00* (2006.01)
(52) U.S. Cl. .............. 700/245; 700/258; 700/259; 700/260; 701/23; 701/300; 446/44; 446/46; 446/175; 446/409; 446/435
(58) Field of Classification Search ........... 700/245, 700/258, 259; 446/44, 46, 175, 409, 435, 446/436, 454, 460, 464; 701/23, 300
See application file for complete search history.

(56) References Cited

U.S. PATENT DOCUMENTS 7,386,133 B2 * 6/2008 Hess et al. ............ 381/26
2003/0182052 A1 * 9/2003 DeLorme et al. ......... 701/201

FOREIGN PATENT DOCUMENTS

KR 10-2000-0066728 11/2000
KR 10-2001-0083059 8/2001

OTHER PUBLICATIONS

Educational Construction Series, Sound Activated Walking Robot, 2005, Internet, p. 1-2.*
Program-a-Bot, Sound Activated Robot, Internet, 2004, p. 1-2.*

* cited by examiner

*Primary Examiner*—Khoi Tran
*Assistant Examiner*—McDieunel Marc
(74) *Attorney, Agent, or Firm*—Staas & Halsey LLP

(57) ABSTRACT

An apparatus and method of controlling a mobile body that travels around a sound source which generates a sound. This apparatus includes a traveling information producer for producing traveling information, which is information about traveling of the mobile body; a direction estimator for estimating a direction in which the mobile body is located with respect to the sound source; and a position determiner for determining a position of the mobile body using the traveling information and the estimated direction of the mobile body.

29 Claims, 15 Drawing Sheets

FIG. 4A
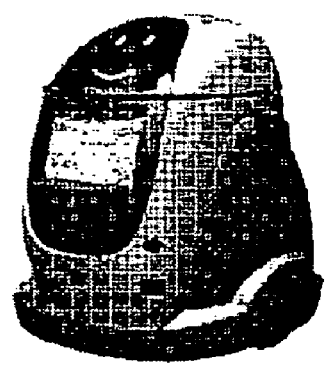
FIG. 4B
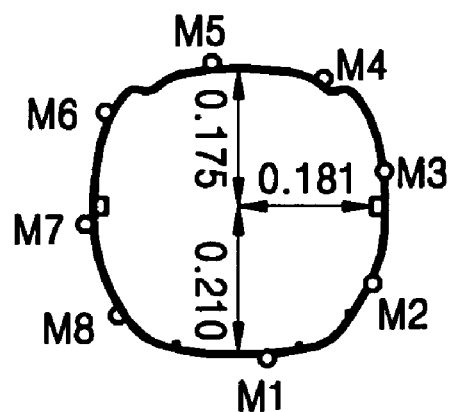
FIG. 4C
M8 M7 M6 M5 M4 M3 M2 M1
o   o   o   o   o   o   o   o

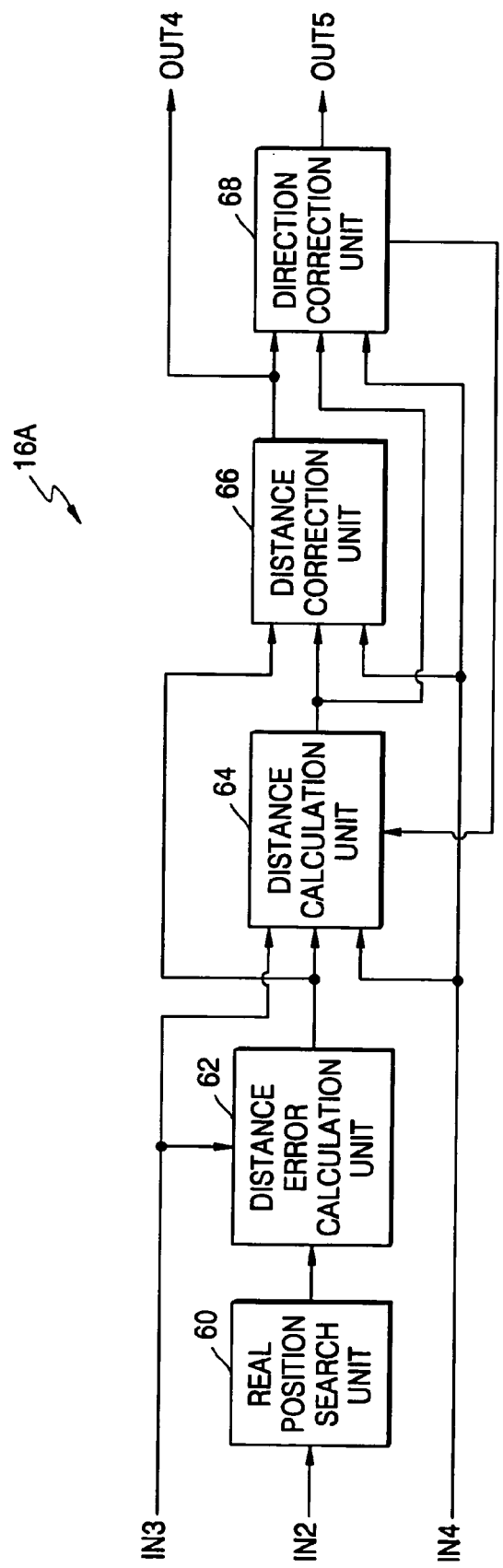

APPARATUS AND METHOD OF CONTROLLING MOBILE BODY

CROSS-REFERENCE TO RELATED APPLICATION

This application claims the benefit of Korean Patent Application No. 2005-0007236, filed on Jan. 26, 2005, in the Korean Intellectual Property Office, the disclosure of which is incorporated herein by reference.

BACKGROUND OF THE INVENTION

1. Field of the Invention

The present invention relates to mobile bodies, such as, robots, and more particularly, to an apparatus for and method of controlling a mobile body.

2. Description of Related Art

A conventional method of estimating a direction of a mobile body with respect to a speaker using a camera and multiple microphones that are attached to a mobile body (e.g., a robot) increases the amount of calculation of an image processor and is sensitively affected by changes of illumination and a background color, thus being incapable of estimating the direction of the mobile body.

A conventional mobile body controlling apparatus must transmit a synchronous signal in order to ascertain a position of a robot. Such conventional mobile body controlling apparatuses, which must transmit a synchronous signal, are disclosed in Korean Patent Application Nos. 2004-0089883 and 2004-0060829.

Some conventional mobile body controlling apparatuses need extra distance-measuring sensors. A conventional mobile body controlling apparatus, which needs an extra distance-measuring sensor, is disclosed in Korean Patent Application No. 2000-0066728.

BRIEF SUMMARY

An aspect of the present invention provides an apparatus for controlling a mobile body using a direction of the mobile body with respect to a sound source and information about traveling of the mobile body.

An aspect of the present invention also provides a method of controlling a mobile body using a direction of the mobile body with respect to a sound source and information about traveling of the mobile body.

According to an aspect of the present invention, there is provided an apparatus for controlling a mobile body that travels around a sound source which generates a sound, the apparatus including: a traveling information producer producing traveling information, which is information about traveling of the mobile body; a direction estimator estimating a direction in which the mobile body is located with respect to the sound source; and a position determiner determining a position of the mobile body using the traveling information and the estimated direction of the mobile body.

According to another aspect of the present invention, there is provided a method of controlling a mobile body that travels around a sound source which generates a sound, the method including: estimating a direction in which the mobile body is located with respect to the sound source; determining a traveling direction of the mobile body using the estimated direction of the mobile body; moving the mobile body a predetermined distance in the determined travelling direction; producing traveling information which is information about the traveling of the mobile body; estimating a direction in which the mobile body is located with respect to the sound source after the mobile body has moved; and determining a position of the mobile body using the traveling information and the estimated directions.

According to another embodiment of the present invention, there is provided a computer-readable storage medium encoded with processing instructions for causing a processor to perform a method of controlling a mobile body that travels around a sound source which generates a sound. The method includes: estimating a direction in which the mobile body is located with respect to the sound source; determining a traveling direction of the mobile body using the estimated direction of the mobile body; moving the mobile body a predetermined distance in the determined travelling direction; producing traveling information about the traveling of the mobile body; estimating a direction in which the mobile body is located with respect to the sound source after the mobile body has moved; and determining a position of the mobile body using the traveling information and the estimated directions.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIGS. 4A, 4B, and 4C illustrate the exterior of a mobile body and configurations of multiple microphones;

FIG. 5 is a block diagram of an example of the position corrector of FIG. 1;

DETAILED DESCRIPTION OF EMBODIMENTS

Figure 1:
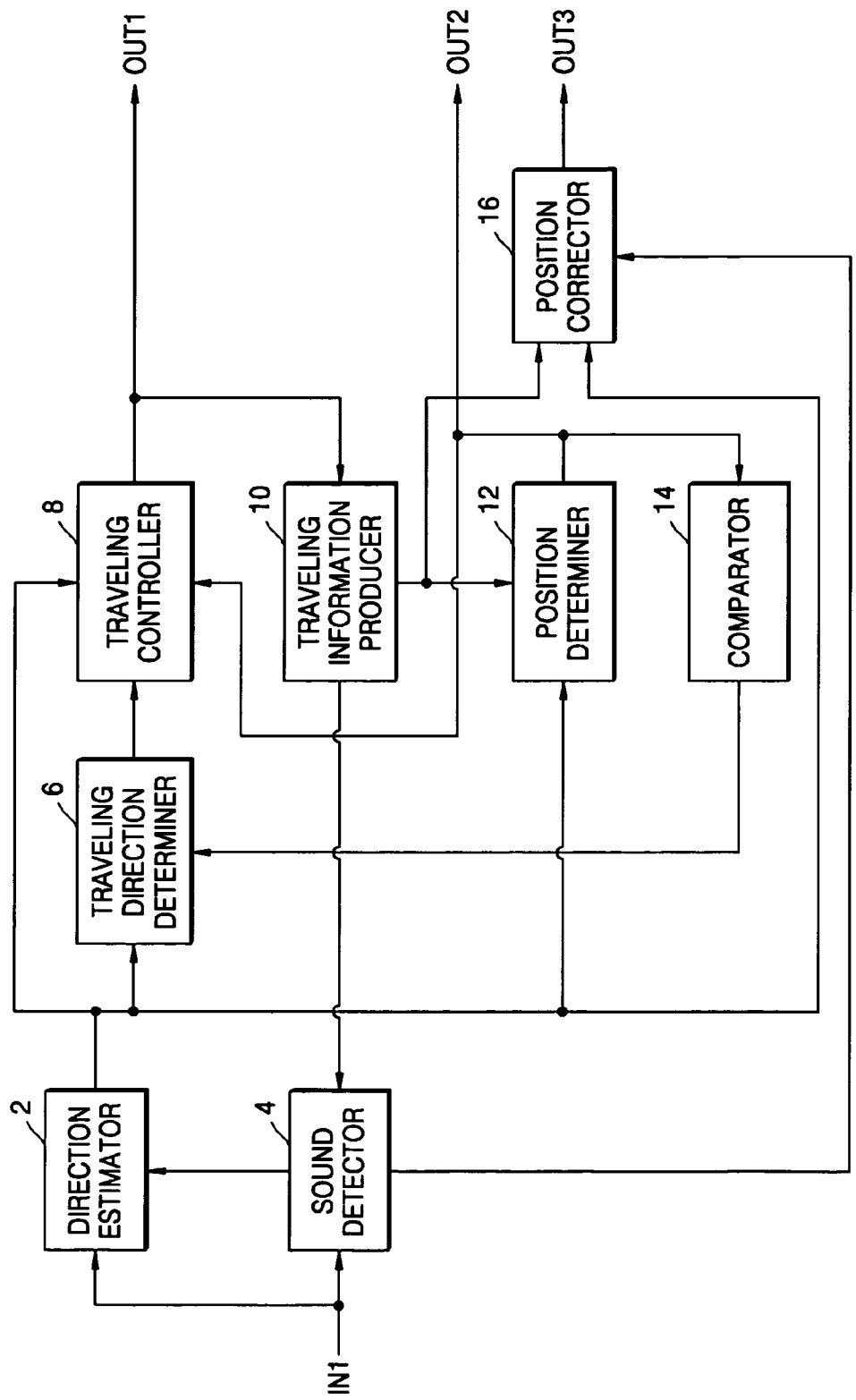
FIG. 1 is a block diagram of a mobile body controlling apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a mobile body controlling apparatus according to an embodiment of the present invention. This mobile body controlling apparatus includes a direction estimator 2, a sound detector 4, a traveling direction determiner 6, a traveling controller 8, a traveling information producer 10, a position determiner 12, a comparator 14, and a position corrector 16.

Figure 2:
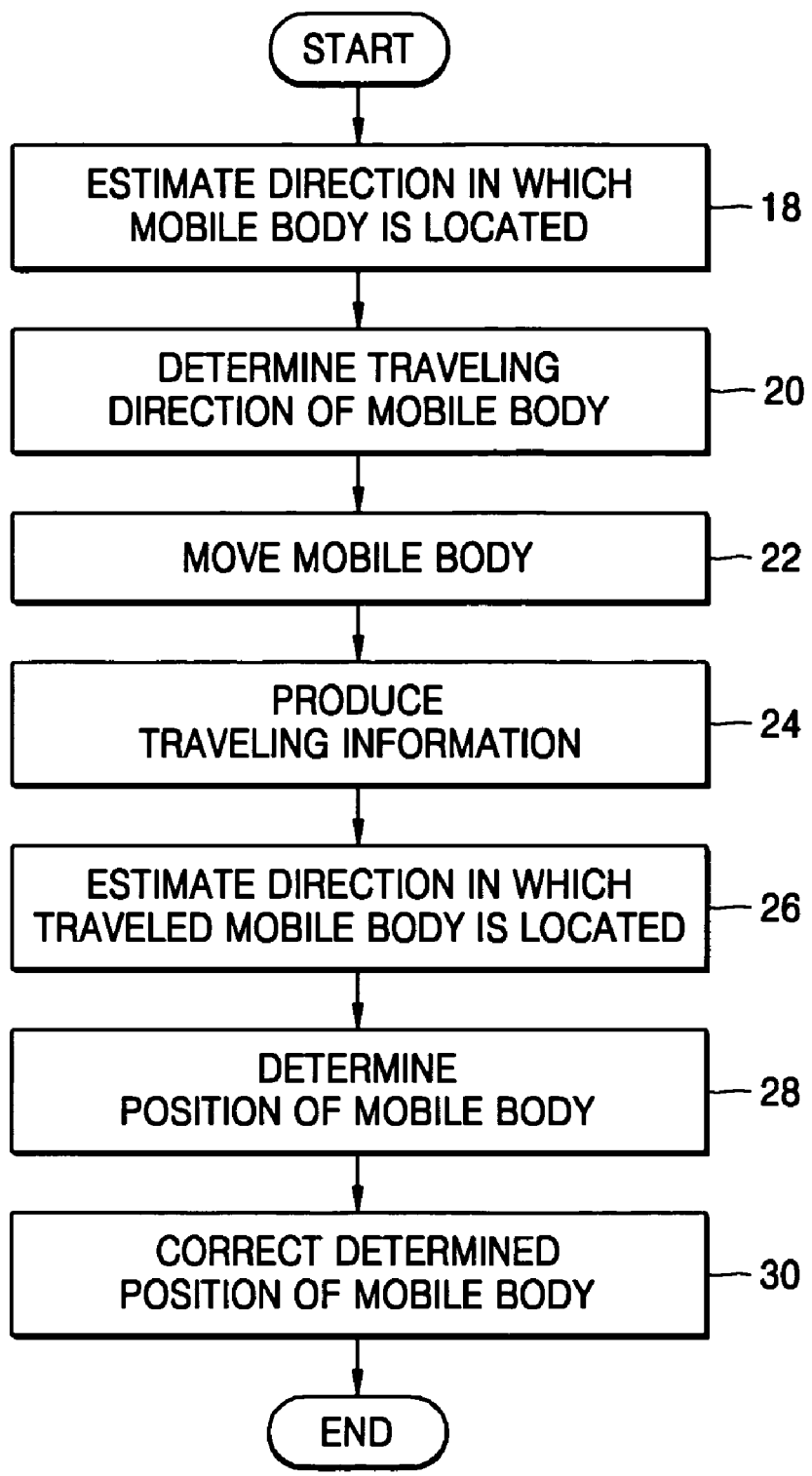
FIG. 2 is a flowchart illustrating a mobile body controlling method according to an embodiment of the present invention.

FIG. 2 is a flowchart illustrating a mobile body controlling method according to an embodiment of the present invention. This method includes operation 18 of estimating a direction in which a mobile body is located, operations 20 and 22 of determining a direction in which the mobile body is to travel and moving the mobile body in the determined direction, operations 24 and 26 of producing information about the traveling of the mobile body and estimating a direction in which the mobile body travels, and operations 28 and 30 of determining a position of the mobile body and correcting the determined position.

Figure 3:
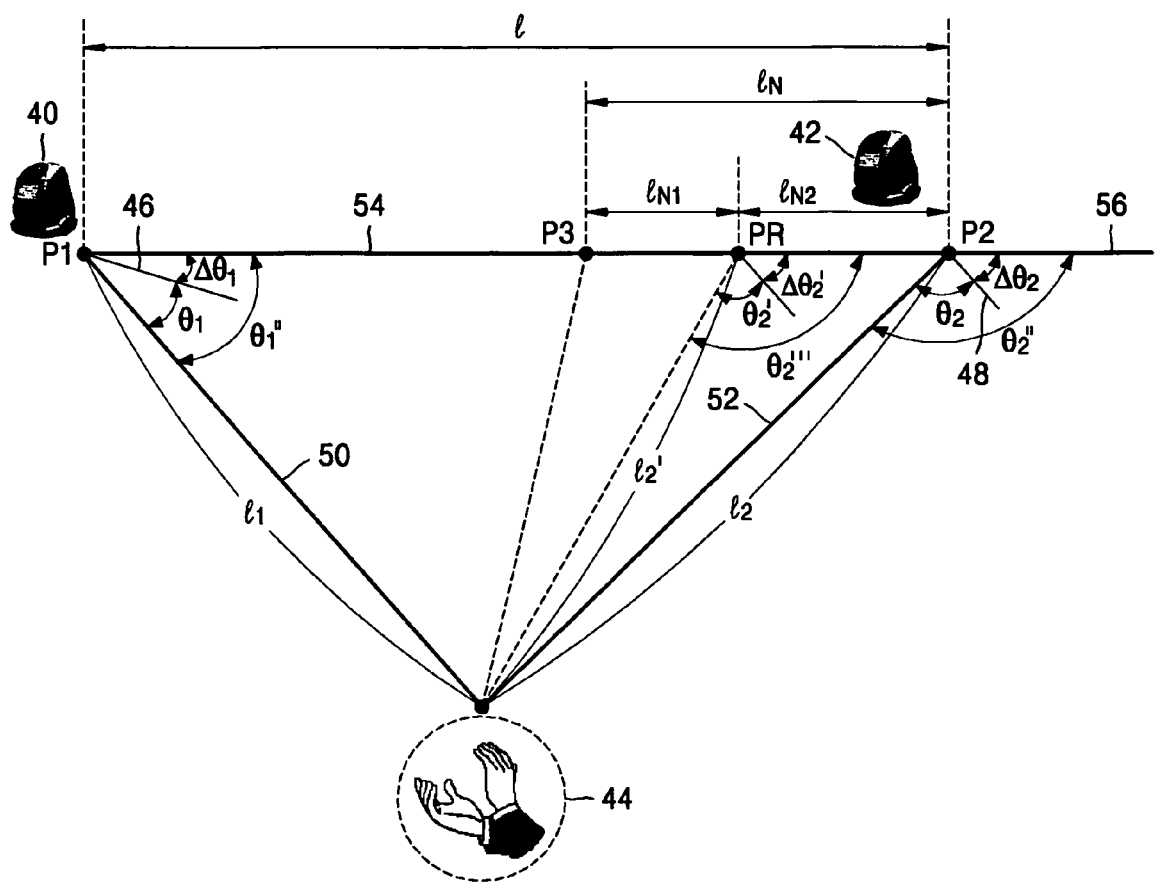
FIG. 3 illustrates a relationship between a sound source and a mobile body.

FIG. 3 illustrates a relationship between a sound source 44 and a mobile body 40 or 42. The mobile body controlling apparatus of FIG. 1 controls the mobile body 40 or 42, which travels around the sound source 44 (e.g., a clapping hand as shown in FIG. 3).

FIG. 4A illustrates an exterior of a mobile body. FIG. 4B illustrates an example of a configuration of multiple microphones attached to the exterior of the mobile body of FIG. 4A. FIG. 4C illustrates another example of a configuration of multiple microphones attached to the exterior of the mobile body of FIG. 4A. For example, the multiple microphones shown in FIGS. 4B and 4C are 8 microphones, namely, M1, M2, M3, M4, M5, M6, M7, and M8.

Referring to FIGS. 1-4, first, in operation 18, the direction estimator 2 estimates a direction in which the mobile body 40 is located with respect to the sound source 44, and outputs the estimated direction to the traveling direction determiner 6, the position determiner 12, and the position corrector 16. At this time, the direction estimator 2 may estimate the direction of the mobile body 40 in response to a sound produced by the sound source 44. To do this, the direction estimator 2 receives the sound produced by the sound source 44 via an input port IN1, for example, via multiple microphones as shown in FIG. 4B or 4C.

Referring to FIG. 3, when the mobile body 40 is located at a first position P1, the direction in which the mobile body 40 is located may be an angle $\theta_1$ between a front direction 46 of the mobile body 40 and a direction 50 in which the mobile body 40 looks at the sound source 44 or an angle $\theta''_1$ between a traveling direction 54 of the mobile body 40 and the direction 50 in which the mobile body 40 looks at the sound source 44. When the mobile body 42 is located at a second position P2, the direction in which the mobile body 42 is located may be an angle $\theta_2$ between a front direction 48 of the mobile body 42 and a direction 52 in which the mobile body 42 looks at the sound source 44 or an angle $\theta''_2$ between a traveling direction 56 of the mobile body 42 and the direction 52 in which the mobile body 42 looks at the sound source 44. As described above, an angle clockwise from the front direction 46 or 48 of the mobile body 40 or 42 or the traveling direction 54 or 56 of the mobile body 40 or 42 may be defined as the direction in which the mobile body 40 or 42 is located. However, the present embodiment is not limited to this angle, so an angle counterclockwise from the front direction 46 or 48 of the mobile body 40 or 42 or the traveling direction 54 or 56 of the mobile body 40 or 42 may also be defined as the direction in which the mobile body 40 or 42 is located.

In operation 20, the traveling direction determiner 6 determines a direction in which the mobile body is to travel using the direction of the mobile body estimated by the direction estimator 2 and outputs the determined traveling direction to the traveling controller 8. For example, as shown in FIG. 3, the traveling direction determiner 6 may sum the angle $\theta_1$, which is the direction of the mobile body 40 estimated by the direction estimator 2, and a predetermined direction $\Delta\theta_1$ and determine a sum $\theta''_1$ as the direction in which the mobile body 40 is to travel.

After operation 20, the travelling controller 8 travels (i.e., moves) the mobile body a predetermined distance in the travelling direction determined by the travelling direction determiner 6, in operation 22. To do this, the travelling controller 8 outputs a travelling control signal for controlling the travelling of the mobile body, that is, a travelling control signal having information about a travelling direction and a predetermined distance, to the mobile body via an output port OUT1. The mobile body receives the travelling control signal output from the travelling controller 8, acquires the predetermined distance and the travelling direction through an analysis of the travelling control signal, and travels by the predetermined distance in the travelling direction. In the case of FIG. 3, the travelling controller 8 travels the mobile body 40 by a predetermined distance l in the determined travelling direction $\theta''_1$.

After operation 22, the traveling information producer 10 produces traveling information, that is, information about the traveling of the mobile body, and outputs the traveling information to the position determiner 12 and the position corrector 16, in operation 24. To do this, the traveling information producer 10 receives the travelling control signal output from the travelling controller 8 and produces the travelling information through an analysis of the travelling control signal. The travelling information may be at least one of a travelling speed, a direction angular speed, and a travelling distance of the mobile body.

In operation 26, the direction estimator 2 estimates a direction in which the mobile body traveled in operation 22 is located with respect to the sound source, and outputs the estimated direction of the moved mobile body to the traveling direction determiner 6, the position determiner 12, and the position corrector 16. To do this, the direction estimator 2 may estimate a direction of the mobile body at regular intervals or every time the mobile body moves. In FIG. 3, the direction estimator 2 estimates the direction of the mobile body 42, which is moved from the first position P1 to the second position P2.

After operation 26, the position determiner 12 determines a position (or a coordinate) of the mobile body using the traveling information received from the traveling information producer 10 and the directions estimated by the direction estimator 2 during operations 18 and 26 and outputs the determined position to the traveling controller 8 and the comparator 14 and to the outside via an output port OUT2, in operation 28. In FIG. 3, the position determiner 12 may determine as the position of the mobile body 42 at least one of a distance $l_2$ between the moving body 42 and the sound source 44 and the direction ($\theta_2$ or $\theta''_2$) of the mobile body 42 with respect to the sound source 44.

The position determiner 12 can estimate the distance $l_2$ between the mobile body 42 and the sound source 44 using triangonometry, as expressed in Equation 1:

$$l_2 = l \times \frac{\sin(\theta_1'')}{\sin(\theta_2'' - \theta_1'')} \quad (1)$$

In Equation 1, l denotes a distance by which the mobile body 40 travels from the first position P1 to the second position P2 and is included in the traveling information, $l_2$ denotes a distance between the mobile body 42 at the second position P2 and the sound source 44, $\theta_1''$ denotes the sum of the angle $\theta_1$, which is the direction of the mobile body 40 at the first position P1 with respect to the sound source 44 estimated by the direction estimator 2, and the predetermined angle $\Delta\theta_1$, and $\theta_2''$ denotes the sum of the angle $\theta_2$, which is the direction of the mobile body 42 at the second position P2 with respect to the sound source 44 estimated by the direction estimator 2, and a predetermined angle $\Delta\theta_2$.

If the mobile body continuously travels, a direction of the mobile body estimated by the direction determiner 2 and a position of the mobile body determined by the position determiner 12 have errors. In other words, when the moving body continuously travels, a estimated direction and/or determined position of the mobile body at a certain location (hereinafter, a current location) on a space are not the direction and/or position of the mobile body at the current location but a direction and/or position of the mobile body at a location that the mobile body has passed earlier than the current location. Hence, at least one of the estimated direction and the determined position of the mobile body that consecutively travels needs to be corrected. In other words, if the mobile body consecutively travels, the mobile body controlling apparatus of FIG. 1 further includes the position corrector 16. In this case, the mobile body controlling method of FIG. 2 further includes operation 30.

After operation 28, the position corrector 16 corrects at least one of the estimated distance between the traveled mobile body and the sound source and the estimated direction of the traveled mobile body using the power distribution of the sound and the triangonometry method and outputs a result of the correction via the output port OUT3, in operation 30. In FIG. 3, the position corrector 16 corrects the estimated distance $l_2'$ between the mobile body 42, which is moved to the second position P2, and the sound source 44 and/or the estimated direction $\theta_2'$ or $\theta_2'''$ of the mobile body 42, which is traveled to the second position P2, using the power distribution of the sound and the triangonometry method and outputs a result ($l_2'$ and/or $\theta_2$ or $\theta_2''$) of the correction via the output port OUT3.

FIG. 5 is a block diagram of an example 16A of the position corrector 16 of FIG. 1. The position corrector 16A includes a real position search unit 60, a distance error calculation unit 62, a distance calculation unit 64, a distance correction unit 66, and a direction correction unit 68.

Figure 6:
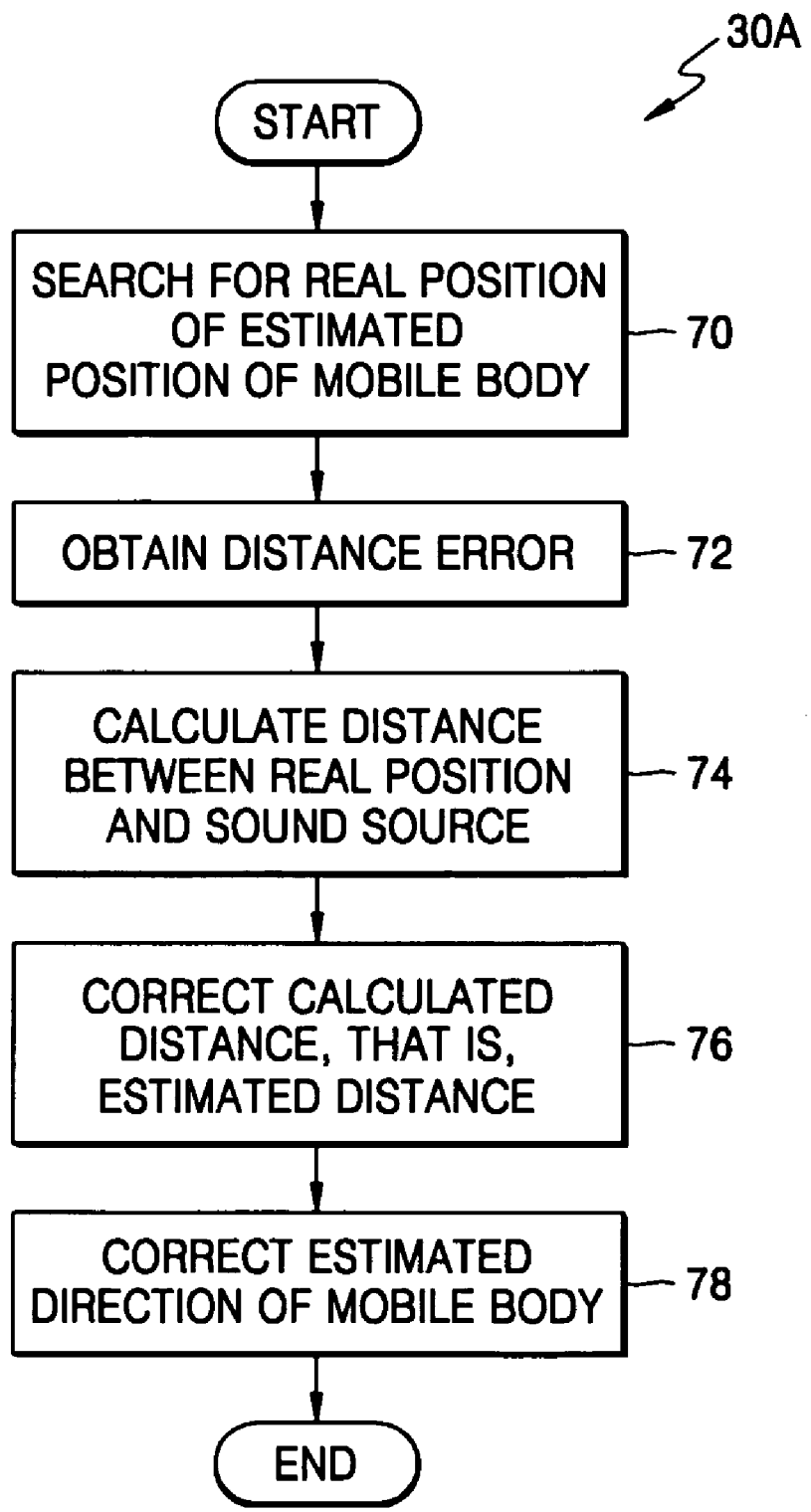
FIG. 6 is a flowchart illustrating an example of operation 30 of FIG. 2.

FIG. 6 is a flowchart illustrating an example of operation 30A of FIG. 2. Operation 30A includes operations 70 and 72 of obtaining a real position for the estimated position of the mobile body and a distance error, operations 74 and 76 of correcting the distance using a distance between the real position and the sound source, and operation 78 of correcting the estimated direction of the mobile body.

To facilitate understanding of the present embodiment, the examples of FIGS. 5 and 6 will now be described with reference to FIG. 3. However, it is to be understood that these examples are not intended to be limiting. Thus, the present embodiment of the present invention is not limited to FIG. 3.

Referring to FIGS. 3, 5, and 6, the real position search unit 60 searches for a real position PR corresponding to the estimated direction of the mobile body on a path between a third position P3, where a direction of the mobile body starts being estimated, and the second position P2, where the estimation of the direction of the mobile body ends, using the power distribution of the sound and outputs the real position PR to the distance error calculation unit 62, in operation 70. To achieve this, the real position search unit 60 receives a sound via an input port IN2. When the mobile body 42, which continuously travels from the first position P1 to the second position P2, has reached the second position P2, the determined position of the mobile body 42 is not a real position of the mobile body 42 at the second position P2 but an estimated position. Accordingly, when the mobile body 42 is located at the second position P2, the real position PR of the mobile body 42 is prior to the second position P2. In other words, when a direction of the mobile body traveling with passing the first position P1 and a distance between the position of the mobile body and the sound source starts being measured at the third position P3, and the measuring of the direction and distance ends at the second position P2, a position of the mobile body 42 located at the second position P2, that is, values estimated as the direction of the mobile body 42 and the distance between the mobile body 42 and the sound source 44 are a direction of the mobile body at the real position PR and the distance between the real position PR and the sound source 44.

The real position search unit 60 may determine as the real position PR a position on the path between the third and second positions P3 and P2 where the sound power satisfies Equation 2:

$$\frac{\sum_{n=N-N_2+1}^{N} P(n)}{\frac{1}{N}\sum_{n=1}^{N} P(n)} = 0.5 \quad (2)$$

In Equation 2, N denotes the number of frames existing between the third and second positions P3 and P2, and P(n) denotes the power of each of the frames. A unit frame may be 80T (where T denotes the length of a sample). The number of frames, N, is equal to Equation 3:

$$N = N_1 + N_2 \quad (3)$$

In Equation 3, $N_1$ denotes the number of frames existing between the third position P3 and the real position PR, and $N_2$ denotes the number of frames existing between the second position P2 and the real position PR.

After operation 70, the distance error calculation unit 62 calculates a distance between the real position PR received from the real position search unit 60 and the second position P2 received from the traveling information producer 10 via an input port IN3 and outputs the distance as a distance error $l_{N2}$ to the distance calculation unit 64 and the distance correction unit 66, in operation 72. The distance error calculation unit 62 may calculate the distance error $l_{N2}$ using Equation 4:

$$l_{N2} = \frac{N_2}{N} l_N \quad (4)$$

In Equation 4, $l_N$ denotes a traveling distance between the third and second positions P3 and P2 by which the mobile body travels as shown in FIG. 3.

After operation 72, the distance calculation unit 64 calculates the distance $l_2$ between the real position PR and the sound source 44 by triangonometry using a result obtained by subtracting the distance error $l_{N2}$ received from the distance error calculation unit 62 from the traveling distance l between the first and second positions P1 and P2, the direction of the mobile body 40 at the first position P1, and the estimated direction of the mobile body 42 at the second position P2, and outputs the calculated distance $l_2$' to the distance correction unit 66, in operation 74. To achieve this, the distance calculation unit 64 receives a traveling distance between the first and second positions P1 and P2 from the traveling information producer 10 via the input port IN3 and the directions of the mobile body at the first and second positions P1 and P2 from the direction estimator 2 via an input port IN4. At this time, the distance calculation unit 64 may receive the direction of the mobile body 40 at the first position P1 corrected by the position correction unit 16 instead of receiving the direction of the mobile body 40 at the first position P2 estimated by the direction estimator 2.

The distance calculation unit 64 may calculate the distance $l_2$' between the real position PR and the sound source 44 using Equation 5:

$$l'_2 = (l - l_{N_2}) \frac{\sin\theta''_1}{\sin(\theta''_2 - \theta''_1)}. \quad (5)$$

In Equation 5, $\theta'''_2$ denotes a direction ($\theta_2' + \Delta\theta_2'$) of a mobile body at the position of the mobile body 42 estimated at the second position P2, that is, at the real position PR.

After operation 74, the distance correction unit 66 corrects the distance, that is, the estimated distance $l_2$' calculated by the distance calculation unit 64 using the distance error calculated by the distance error calculation unit 62 and the estimated direction $\theta'''_2$ of the mobile body 42 located at the second position P2 and outputs the corrected distance $l_2$ to the direction correction unit 68 and to the outside via an output port OUT4, in operation 76. To do this, the distance correction unit 66 may receive the estimated direction $\theta'''_2$ of the mobile body 42 located at the second position P2 from the direction estimator 2 via an input port IN4.

The distance correction unit 66 can obtain the real distance $l_2$ between the position P2 and the sound source 44 by correcting the distance $l_2$' estimated as the distance between the mobile body 42 at the second position P2 and the sound source 44 using Equation 6:

$$l_2 = \sqrt{l_{N_2}^2 + l'^2_2 - 2l_{N_2} l'_2 \cos(\theta''_2)}. \quad (6)$$

After operation 76, the direction correction unit 68 corrects the estimated direction of the mobile body 42 using a ratio between the distance corrected by the distance correction unit 66 and the estimated distance $l_2$' calculated by the distance calculation unit 64 and outputs the result of the correction via an output port OUT5, in operation 78.

The direction correction unit 68 may correct the direction estimated at the second position P2 as the direction of the mobile body located at the second position P2 with respect to the sound source 44 using Equation 7:

$$\theta''_2 = a \sin\left(\sin(\theta''_2) \frac{l'_2}{l_2}\right). \quad (7)$$

In Equation 7, $\theta''_2$ denotes a direction obtained by correcting the estimated direction $\theta_2$ of the mobile body 42 at the second position P2.

According to another embodiment of the present invention, the mobile body controlling apparatus of FIG. 1 may include only the direction estimator 2, the traveling information producer 10, and the position determiner 12. In this case, the mobile body controlling method of FIG. 2 includes only operations 18, 24, 26, and 28. And, in this case, a mobile body can travel without being restricted by the operations of the traveling direction determiner 6 and the traveling controller 8 of FIG. 1.

If the mobile body discontinuously travels, the mobile controlling apparatus of FIG. 1 does not need the position corrector 16. In this case, the mobile body controlling method of FIG. 2 does not need operation 30 because the position determined in operation 28 is not the estimated position of the mobile body but the real position thereof.

An apparatus and method of controlling a mobile body that travels discontinuously according to an embodiment of the present invention will now be described with reference to the attached drawings.

Figure 7:
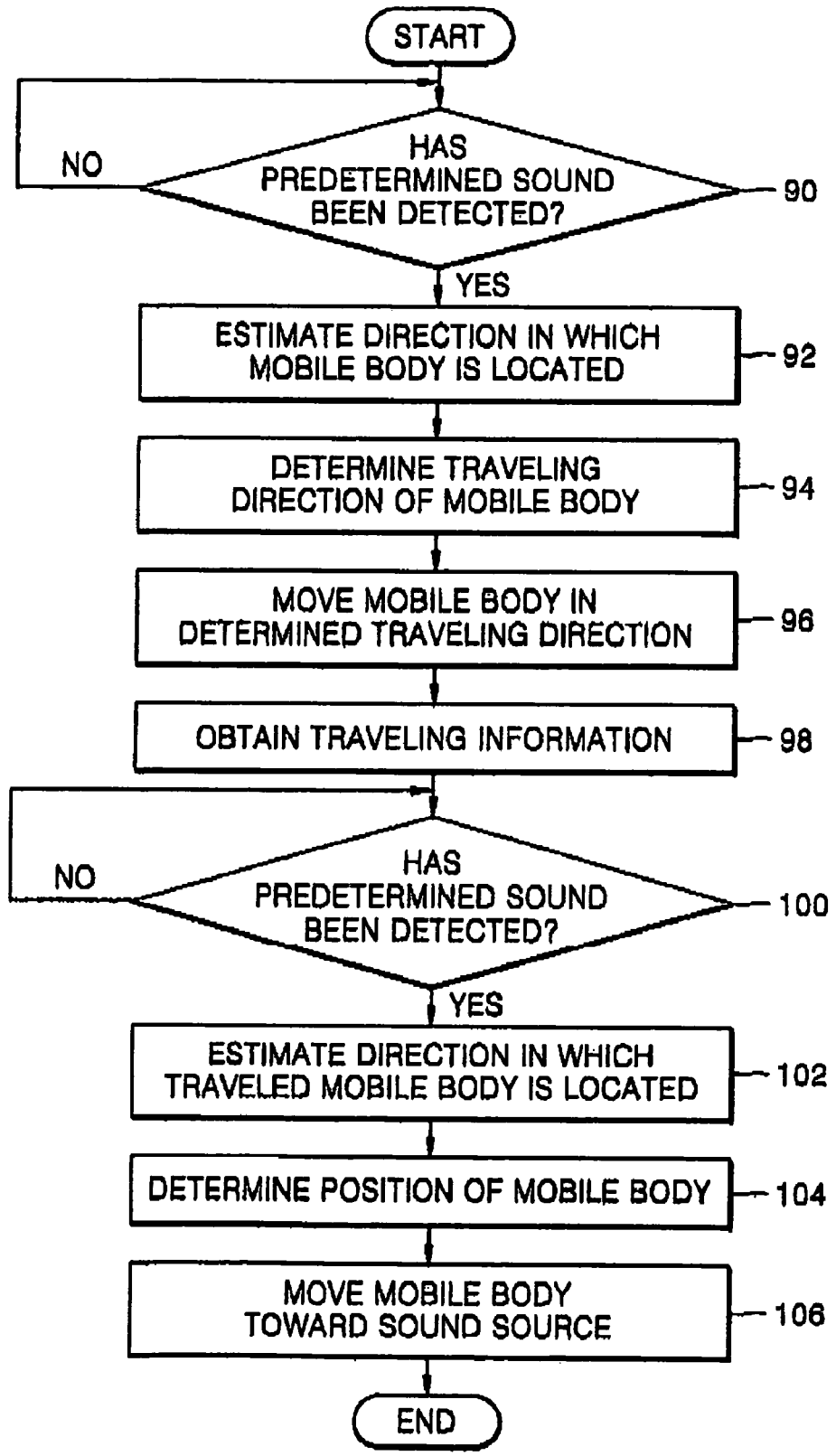
FIG. 7 is a flowchart illustrating a mobile body controlling method according to an embodiment of the present invention.

FIG. 7 is a flowchart illustrating a mobile body controlling method according to another embodiment of the present invention. This method includes operations 90 and 92 of estimating a direction of a mobile body when a predetermined sound is detected, operations 94 and 96 of determining a traveling direction of the mobile body and traveling (i.e., moving) the mobile body in the determined traveling direction, operations 98, 100, and 102 of obtaining traveling information and estimating a direction of the traveled mobile body when a predetermined sound is again detected, and operations 104 and 106 of determining a position of the mobile body and moving the mobile body toward a sound source.

According to the present embodiment, the mobile body controlling apparatus of FIG. 1 may further include the sound detector 4. In this case, the sound detector 4 checks if a predetermined sound has been received via the input port IN1, that is, if the predetermined sound has been detected, and outputs a result of the checking as a sound detection signal to the direction estimator 2. In other words, the sound detector 4 determines whether the predetermined sound has been detected, in operation 90. The predetermined sound, which is predetermined by a user, may be a voice that calls the name of a robot, a clap, or a sinusoidal signal having a specific frequency. The sound detector 4 may output the detected sound to the real position search unit 60 of the position corrector 16A.

The direction estimator 2 of FIG. 1 estimates a direction of the mobile body in response to the sound detection signal received from the sound detector 4 and outputs the estimated direction, in operation 92. In other words, when it is recognized from the sound detection signal that the predetermined sound has been detected, the direction estimator 2 estimates the direction of the mobile body using a section where the predetermined sound has been detected.

Operations 94, 96, 98, and 104 of FIG. 7 are the same as operations 20, 22, 24, and 28 of FIG. 2, respectively, so a detailed description thereof will be omitted.

After operation 98, the sound detector 4 checks if predetermined sound has been received via the input port IN1, that is, if predetermined sound has been detected, and outputs a result of the checking as a sound detection signal to the direction estimator 2, in operation 100. In other words, the sound detector 4 determines again whether the predetermined sound has been detected. To do this, when it is recognized that the traveling information producer 10 has completed producing the traveling information, the sound detector 4 can perform operation 100.

At this time, the direction estimator 2 estimates the direction of the mobile body traveled in operation 96 in response to the sound detection signal received from the sound detector 4 and outputs the estimated direction, in operation 102.

An example of the estimation of the direction of the mobile body using the detected sound in operation 92 or 102 of FIG. 7 is disclosed in paper entitled "Audio-Visual Speaker Localization for Car Navigation System" by Xianxian Zhang, et al. published in the Inter. Conf. on Spoken Language Processing (ICSLP) Institute in 2004.

Structures and operations of examples of the sound detector 4 of FIG. 1 will now be described with reference to the accompanying drawings.

Figure 8:
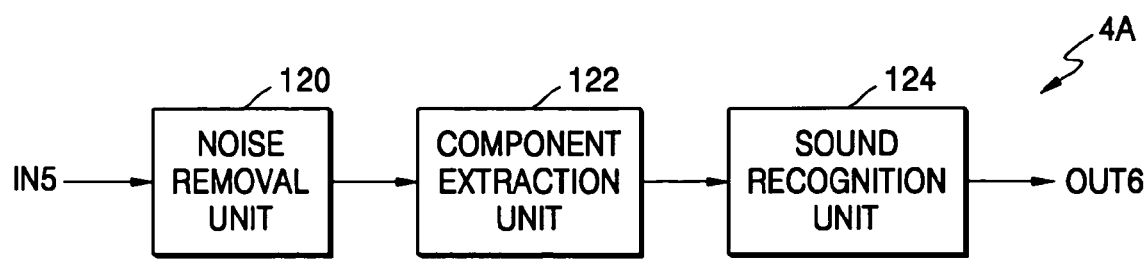
FIG. 8 is a block diagram of example of the sound detector of FIG. 1.

FIG. 8 is a block diagram of an example 4A of the sound detector 4A. The sound detector 4A includes a noise removal unit 120, a component extraction unit 122, and a sound recognition unit 124.

The noise removal unit 120 receives a sound via an input port IN5, removes noise from the received sound, and outputs the noise-removed sound to the component extraction unit 122. In other words, the noise removal unit 120 may be implemented as a 1-channel speech enhancement (SE) device.

An example of the SE device is disclosed in paper entitled "Speech Enhancement Using a Minimum Mean Square Error Short-time Spectral Amplitude Estimator" by Yariv Ephraim and David Malah, in IEEE Transactions on acoustics, speech and signal processing, Vol. ASSP-32, No. 6, pp. 1109-1121, December 1984.

The component extraction unit 122 extracts a signal component at a level equal to or greater than a predetermined level from the noise-removed sound received from the noise removal unit 120 and outputs the extracted signal component to the sound recognition unit 124. To do this, the component extraction unit 122 may be implemented as a voice activity detector (VAD). An example of the VAD was introduced by Qi Li et al. entitled "Robust Endpoint Detection and Energy Normalization for Real-time Speech and Speaker Recognition", IEEE Transactions on speech and audio processing, Vol. 10, No. 3, pp. 46-157, March 2002.

The sound recognition unit 124 checks if the signal component extracted by the component extraction unit 122 is a predetermined sound and outputs a result of the checking as a sound detection signal via an output port OUT6.

Figure 11:
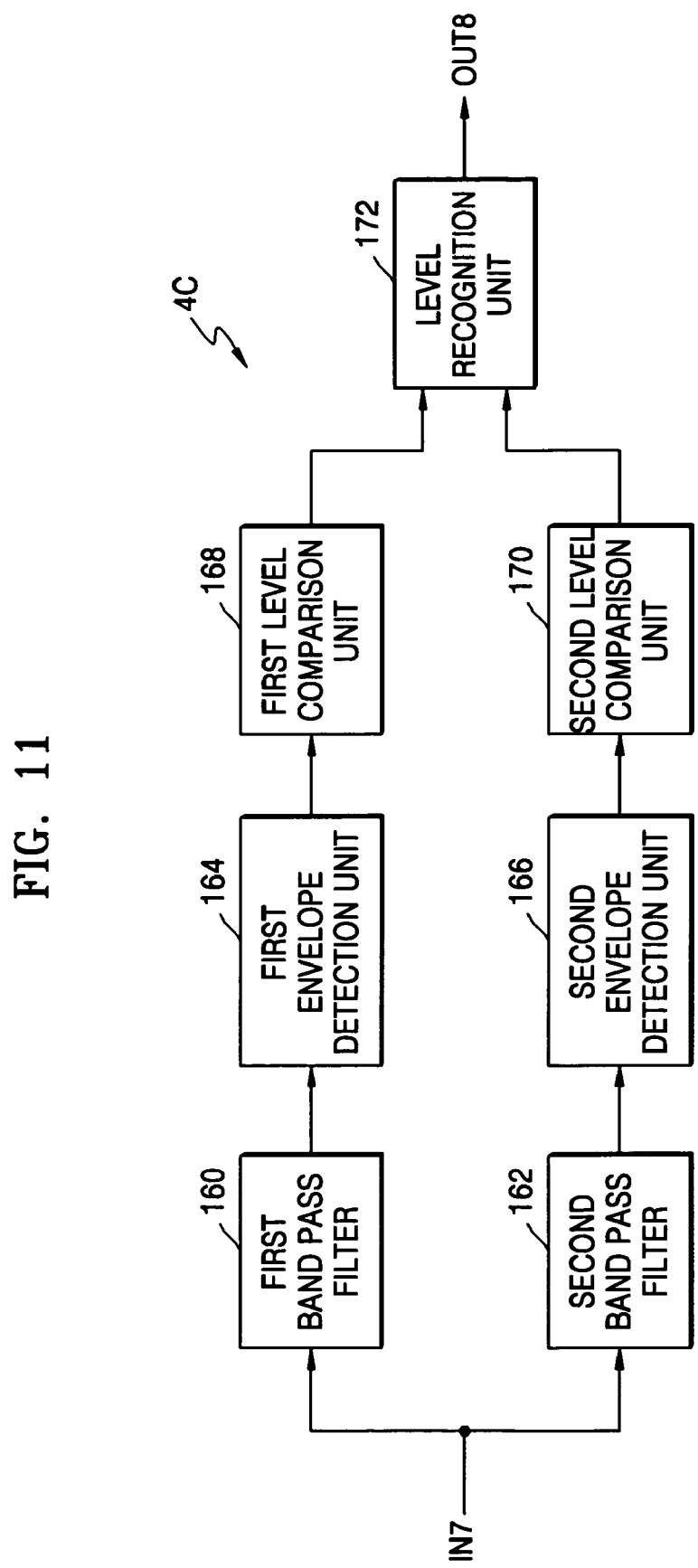
FIG. 11 is a block diagram of still another example of the sound detector of FIG. 1.

If the predetermined sound, which is produced by a sound source, is intermittent like a clap or a voice, the sound detector 4 may be implemented as shown in FIG. 8. On the other hand, if the predetermined sound is a continuously generated sound, such as, a sinusoidal sound having a predetermined frequency, the sound detector 4 may detect the sound using a correlation method or a fast Fourier transform (FFT) method. If the predetermined sound is an ultrasonic signal, the sound detector 4 may be implemented as shown in FIGS. 9 or 11.

Figure 9:
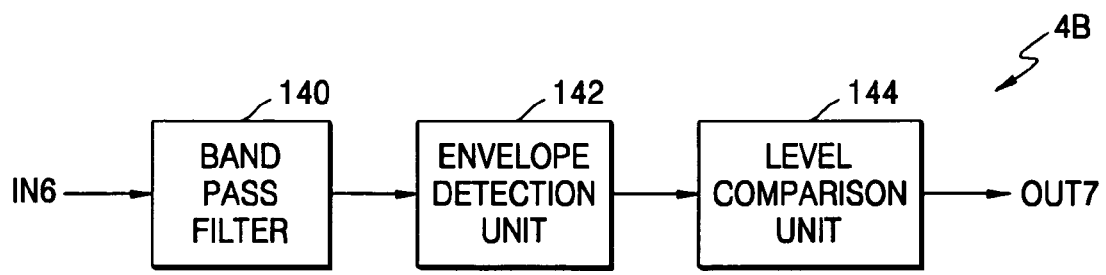
FIG. 9 is a block diagram of another example of the sound detector of FIG. 1.

FIG. 9 is a block diagram of an example 4B of the sound detector 4B. The sound detector 4B includes a band pass filter 140, an envelope detection unit 142, and a level comparison unit 144.

Figure 10:
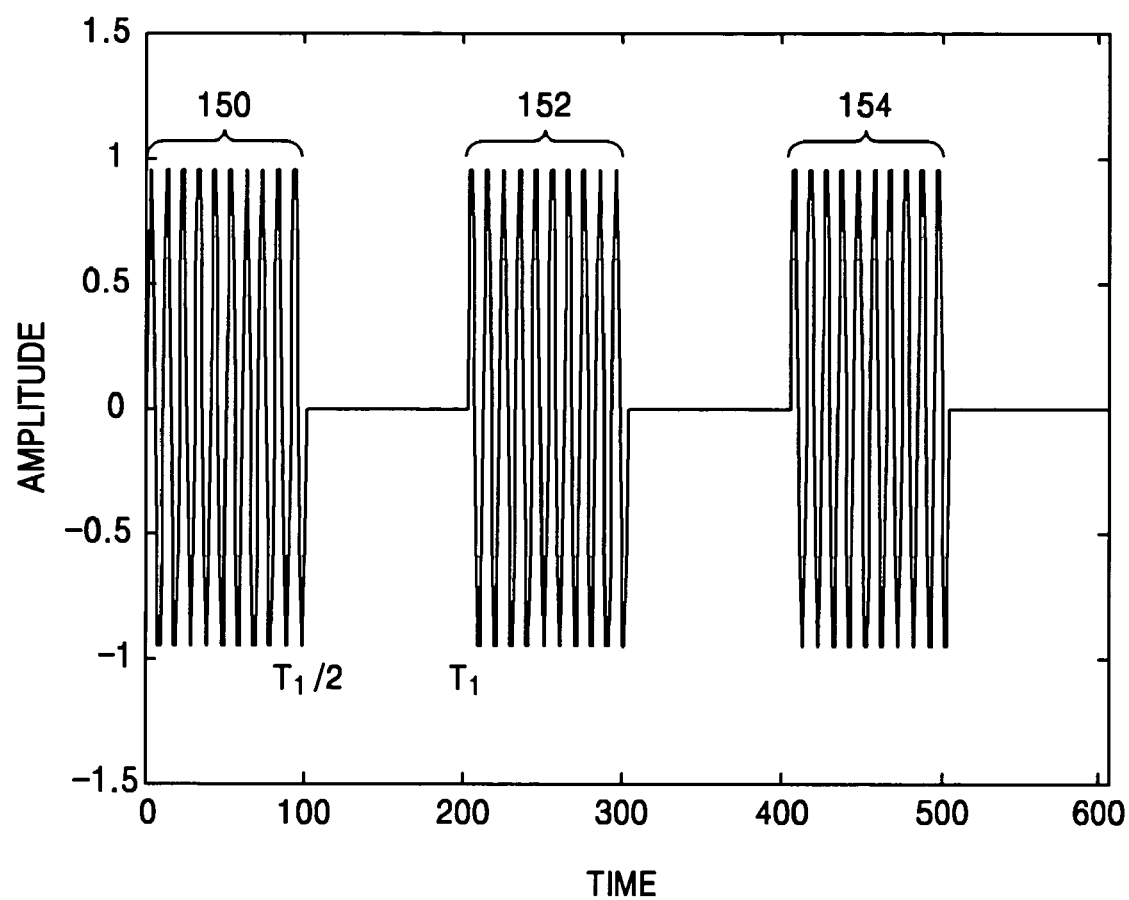
FIG. 10 is a graph for facilitating understanding of the sound detector of FIG. 9.

FIG. 10 is a graph for facilitating understanding of the sound detector 4B. In FIG. 10, the horizontal axis indicates the time, and the vertical axis indicates the amplitude.

Referring to FIGS. 9 and 10, the band pass filter 140 receives a produced sound via an input port IN6, filters a predetermined band component out of the received sound, and outputs the filtered sound to the envelope detection unit 142. For example, the band pass filter 140 may filter out predetermined band components 150, 152, and 154 shown in FIG. 10. The envelope detection unit 142 detects an envelope of a result of the band pass filtering by the band pass filter 140 and outputs the envelope to the level comparison unit 144. The level comparison unit 144 compares a level of the envelope detected by the envelope detection unit 142 with a critical level and outputs a result of the comparison as a sound detection signal via an output port OUT7.

FIG. 11 is a block diagram of an example 4C of the sound detector 4. The sound detector 4C includes first and second band pass filters 160 and 162, first and second envelope detection units 164 and 166, first and second level comparison units 168 and 170, and a level recognition unit 172.

Figure 12:
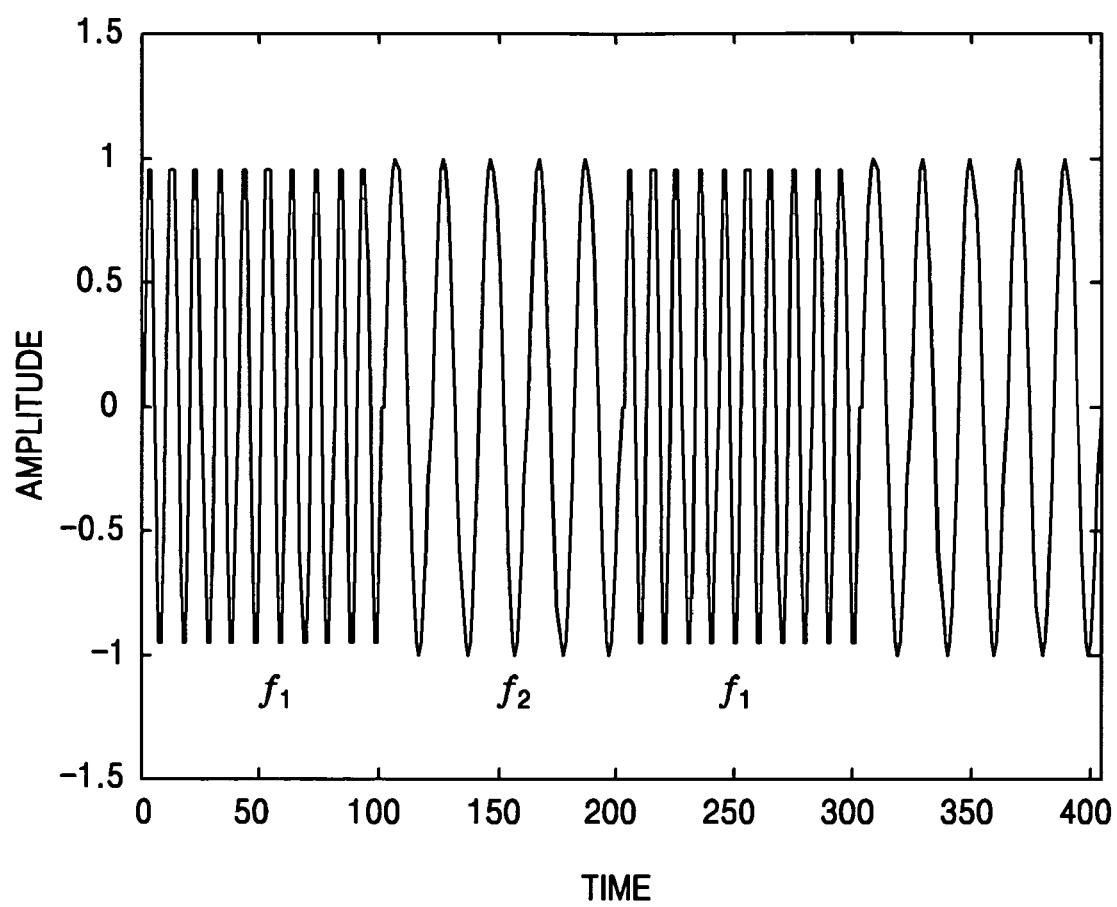
FIG. 12 is a graph facilitating understanding of the sound detector of FIG. 11.

FIG. 12 is a graph facilitating understanding of the sound detector 4C. In FIG. 12, the horizontal axis indicates the time, and the vertical axis indicates the amplitude.

Referring to FIGS. 11 and 12, the first band pass filter 160 receives a produced sound via an input port IN7, filters a first predetermined band component out of the sound, and outputs a result of the filtering to the first envelope detection unit 164. Similarly, the second band pass filter 162 receives the produced sound via the input port IN7, filters a second predetermined band component out of the sound, and outputs a result of the filtering to the second envelope detection unit 166. For example, the first and second predetermined band components are $f_1$ and $f_2$, respectively, as shown in FIG. 12.

The first envelope detection unit 164 detects an envelope of a result of the band pass filtering by the first band pass filter 160 and outputs the envelope to the first level comparison unit 168. Similarly, the second envelope detection unit 166 detects an envelope of a result of the band pass filtering by the second band pass filter 162 and outputs the envelope to the second level comparison unit 170.

The first level comparison unit 168 compares a level of the envelope detected by the first envelope detection unit 164 with a first critical level and outputs a result of the comparison to the level recognition unit 172. The second level comparison unit 170 compares a level of the envelope detected by the second envelope detection unit 166 with a second critical level and outputs a result of the comparison to the level recognition unit 172.

The level recognition unit 172 determines whether the first and second predetermined band components are detected alternately using the results of the comparisons by the first and second level comparison units 168 and 170 and outputs a result of the determination as the sound detection signal via an output port OUT8. In other words, referring to FIG. 12, the level recognition unit 172 determines whether the first and second predetermined band components $f_1$ and $f_2$ are alternately detected using the results of the comparisons by the first and second level comparison units 168 and 170 and outputs a result of the determination as the sound detection signal.

The mobile body controlling method of FIG. 7 may further include operation 106. In this case, the traveling controller 8 of FIG. 1 moves the mobile body toward the sound source according to the direction of the mobile body estimated by the direction estimator 2 and the distance between the mobile body and the sound source determined by the position determiner 12, in operation 106. To do this, the direction of the mobile body estimated by the direction estimator 2 may be input directly to the traveling controller 8, or the estimated direction may be input to the traveling direction determiner 6 to be used in determining the traveling direction of the mobile body.

A method of controlling a mobile body to continuously or discontinuously travel toward a sound source according to the present embodiment will now be described with reference to the accompanying drawings. In this case, the mobile body controlling apparatus of FIG. 1 may further include the comparator 14.

Figure 13:
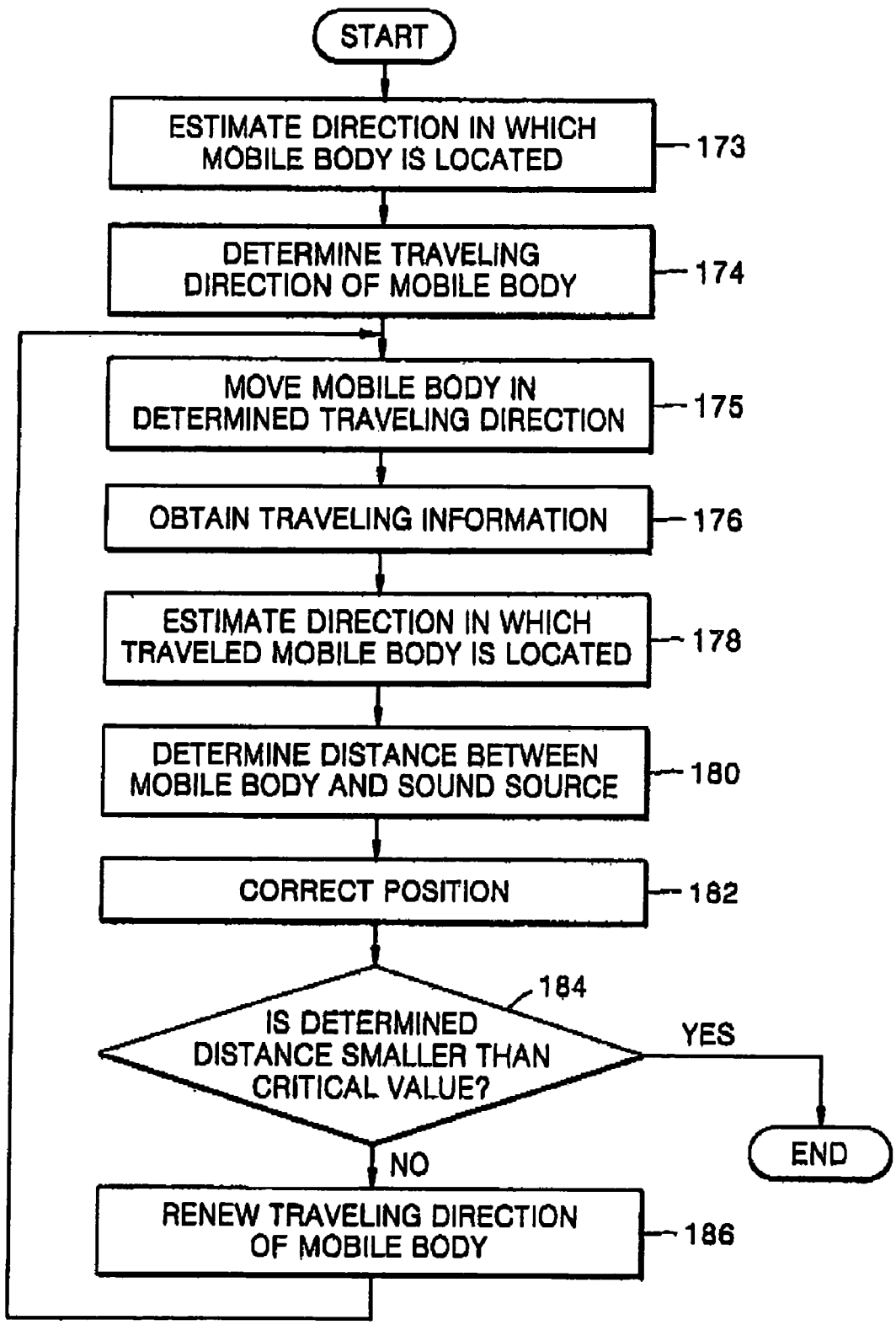
FIG. 13 is a flowchart illustrating a mobile body controlling method according to an embodiment of the present invention.

FIG. 13 is a flowchart illustrating a mobile body controlling method according to still another embodiment of the present invention. Referring to FIG. 13, the method includes operation 173 of estimating a direction in which a mobile body is located, operations 174 and 175 of determining a traveling direction of the mobile body and traveling the mobile body in the determined traveling direction, operations 176 and 178 of obtaining traveling information and estimating a direction of the traveled mobile body, operations 180 and 182 of determining a distance between the mobile body and a sound source and correcting the position, and operations 184 and 186 of determining whether the determined distance is less than a critical value and renewing the traveling direction of the mobile body using the determined distance.

Operations 173 through 182 of FIG. 13 are the same as operations 18 through 30 of FIG. 2, so a detailed description thereof will be omitted. Accordingly, if the mobile body travels discontinuously, the mobile body controlling method of FIG. 13 may not include operation 182.

After operation 182, the comparator 14 compares the determined distance received from the position determiner 12 with a critical value and outputs a result of the comparison to the traveling direction determiner 6. In other words, the comparator 14 determines whether the determined distance is smaller than the critical value and outputs a result of the determination to the direction determiner 6, in operation 184.

The traveling direction determiner 6 renews the traveling direction of the mobile body in response to the result of the comparison by the comparator 14 and outputs the renewed traveling direction to the traveling controller 8. In other words, when it is recognized from the result of the comparison by the comparator 14 that the determined distance is equal to or greater than the critical value, the traveling direction determiner 6 renews the traveling direction using the direction estimated in operation 180 and outputs the renewed traveling direction to the traveling controller 8, in operation 186. Accordingly, in operation 175, the traveling controller 8 travels the mobile body a predetermined distance in the renewed traveling direction.

Figure 14:
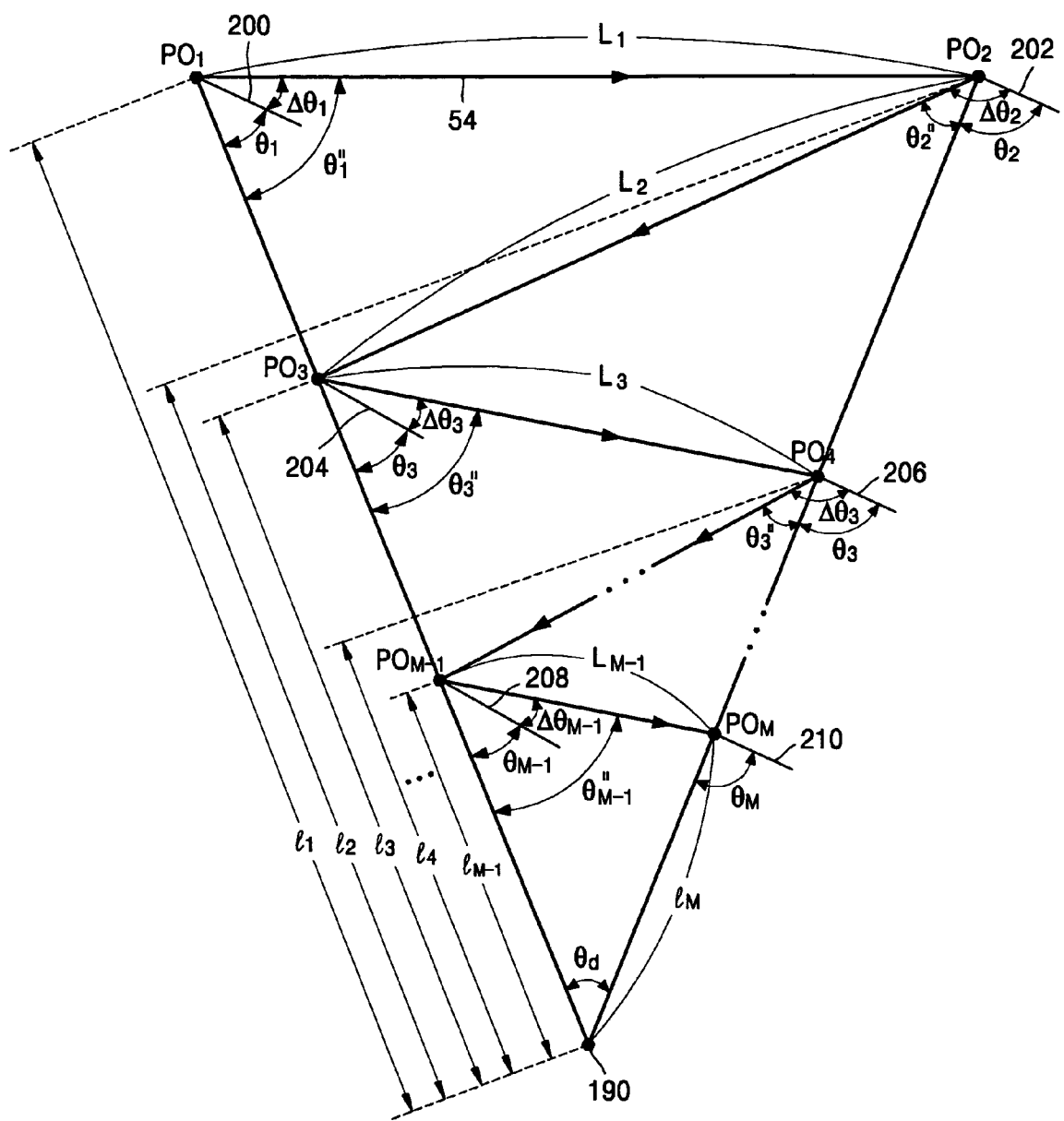
FIG. 14 is a diagram facilitating understanding of the mobile body controlling method of FIG. 13.

FIG. 14 is a diagram facilitating understanding of the mobile body controlling method of FIG. 13. In FIG. 14, $PO_1$, $PO_2$, $PO_3$, $PO_4$, ..., $PO_{M-1}$, and $PO_M$ (where M denotes a positive integer equal to or greater than 2) denote positions through which the mobile body passes, and $l_1$, $l_2$, $l_3$, $l_4$, ..., $l_{M-1}$, and $l_M$ denote distances between the mobile body and a sound source 190. Reference numerals 200, 202, 204, 206, 208, and 210 indicate front directions of the mobile body, and an arrow indicates a traveling direction of the mobile body.

Although a direction of the mobile body estimated by the direction estimator 2 is assumed $\theta_M$ instead of $\theta_M''$ to facilitate understanding of the present embodiment, the present embodiment is not limited to this assumption.

At first, it is assumed that the mobile body is located at position $PO_1$. At this time, the direction estimator 2 estimates an angle $\theta_1$, namely, a direction of the mobile body at position $PO_1$, in operation 173. After operation 173, the traveling direction determiner 6 adds predetermined angle $\Delta\theta_1$ to the estimated direction $\theta_1$ of the mobile body and determines a sum $\theta_1''$ ($\theta_1+\Delta\theta_1$) as a travelling direction 54, in operation 174. At this time, the travelling controller 8 moves the mobile body by a predetermined distance in the determined travelling direction, in operation 175. The predetermined distance may not exceed a predetermined angle $\theta_d$. The travelling information producer 10 obtains as travelling information of the mobile body a distance $L_1$ from position $PO_1$, where the mobile body starts traveling, to position $PO_2$, where the mobile body ends traveling, in operation 176. The direction estimator 2 estimates a direction $\theta_2$ of the mobile body that is traveled in operation 175 and located to position $PO_2$, in operation 178. The position determiner 12 determines as a position (or a coordinate) of the mobile body a distance $l_2$ between the mobile body at position $PO_2$ and the sound source 190 in operation 180. If the mobile body continuously travels, the position corrector 16 corrects the determined position, that is, the determined distance between the mobile body and the sound source, in operation 182.

At this time, the comparator 14 determines whether the determined distance $l_2$ is smaller than a critical value, in operation 184. If it is determined that the distance $l_2$ is equal to or greater than the critical value, the travelling direction determiner 6 renews a travelling direction of the mobile body at position $PO_2$, in operation 186. At this time, the traveling controller 8 again moves the mobile body from position $PO_2$ to position $PO_3$ according to the renewed traveling direction and a predetermined distance.

As described above, the direction estimator 2, the traveling direction determiner 6, the traveling controller 8, the traveling information producer 10, the position determiner 12, the comparator 14, and the position corrector 16 repeat operations 175 through 186 of FIG. 13 until the determined distance is smaller than the critical value. When the mobile body reaches position POM through a repetition of these operations, and a determined distance $l_M$ between the mobile body and the sound source 190 is smaller than the critical value, the mobile body completes travelling. In other words, when it is recognized from a result of the comparison by the comparator 14 that the determined distance $l_M$ is smaller than the critical value, the travelling controller 8 determines that the mobile body has travelled by a desired distance toward the sound source 190 and thus stops the travelling of the mobile body.

The apparatus and method of determining the position (or the coordinate) of the mobile body using a direction of the mobile body with respect to the sound source and the information about the travelling of the mobile body, according to the present embodiment, will now be described with reference to the accompanying drawings. The position determiner 12 predicts a current position of the mobile body using the travelling information produced by the travelling information producer 10, corrects the predicted current position of the mobile body using the direction of the mobile body estimated by the direction estimator 2, and outputs the corrected position as a determined position of the mobile body.

Figure 15:
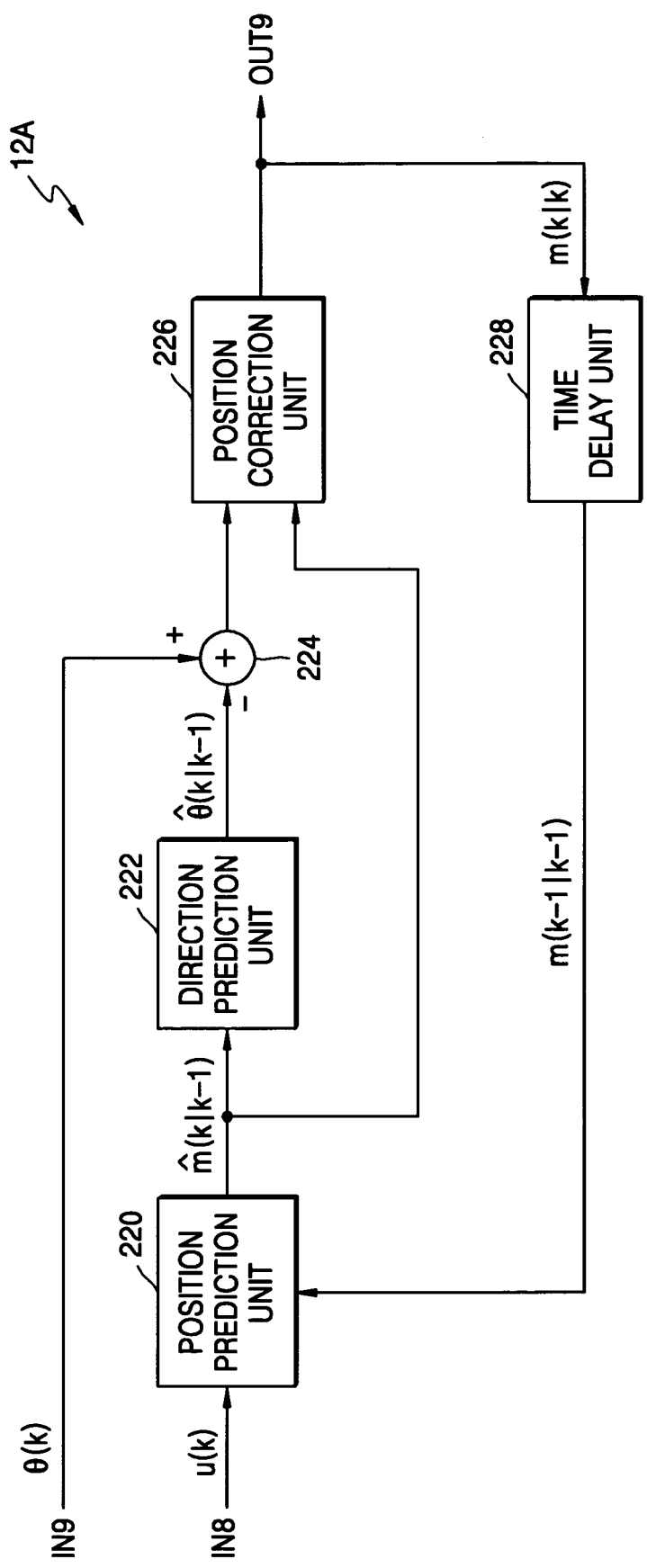
FIG. 15 is a block diagram of an example of the position determiner of FIG. 1.

FIG. 15 is a block diagram of an example 12A of the position determiner of FIG. 1. The position determiner 12A includes a position prediction unit 220, a direction prediction unit 222, a direction error production unit 224, a position correction unit 226, and a time delay unit 228.

The position prediction unit 220 predicts a position of the mobile body using the delay result of the time delay unit 228 and the traveling information received from the traveling information producer 10 via an input port IN8 and outputs the predicted position of the mobile body to the direction prediction unit 222 and the position correction unit 226. For example, the position prediction unit 220 may predict the position of the mobile body as shown in Equation 8.

$$\hat{m}(k|k-1)=m(k-1|k-1)+f(u(k)) \quad (8)$$

wherein $\hat{m}(k|k-1)$, which is the position of the mobile body predicted in the position prediction unit 220, denotes a predicted state of $m(k)$ at time $(k-1)$, $m(k)$ denotes a vector that represents a position of the mobile body at time $(k)$, and $m(k-1|k-1)$ denotes a estimated state of $m(k-1)$ at time $(k-1)$ and can be calculated using Equation 9:

$$m(k-1|k-1)=\hat{m}(k-1|k-2)+K(k-1)[\theta(k-1)-h(\hat{m}(k-1|k-2))] \quad (9)$$

wherein $\hat{m}(k-1|k-2)$ denotes a predicted state of $m(k-1)$ at time $(k-2)$, and a state model of $m(k)$ is defined as in Equation 10:

$$m(k)=[x(k),y(k),\Phi(k)] \quad (10)$$

wherein $x(k)$ and $y(k)$ denote coordinates of x-axis and y-axis directions, respectively, of a mobile body that travels on a two-dimensional space, and $\phi(k)$ denotes a front direction of the mobile body. The $x(k)$ and $y(k)$ and $\phi(k)$ are expressed as in Equation 11:

$$\dot{x}(k)=a(k)\cos(\phi(k))$$

$$\dot{y}(k)=a(k)\sin(\phi(k))$$

$$\dot{\phi}(k)=w(k) \quad (11)$$

wherein $\dot{x}(k)$ denotes a differentiated form of $x(k)$, $\dot{y}(k)$ denotes a differentiated form of $y(k)$, $\dot{\phi}(k)$ denotes a differentiated form of $\phi(k)$, $\omega(k)$ denotes a directional angular velocity of a mobile body, and $a(k)$ denotes a traveling velocity of the mobile body.

The state model of $m(k)$ defined as in Equation 10 may also be expressed as in Equation 12:

$$m(k)=m(k-1)+f(u(k))+w(k) \quad (12)$$

wherein $w(k)$ denotes process noise, and $f(u(k))$ may be expressed as in Equation 13:

$$f(u(k)) = \begin{bmatrix} T\cos\phi(k) & 0 \\ T\sin\phi(k) & 0 \\ 0 & T \end{bmatrix} \quad (13)$$

wherein $u(k)$ denotes traveling information and may be expressed as in Equation 14:

$$u(k)=[a(k),w(k)] \quad (14)$$

$K(k-1)$ and $\theta(k-1)-h(\hat{m}(k-1|k-2))$ in Equation 9 will be described later. In the later description, the explanation of $K(k)$ and $\theta(k)-h(\hat{m}(k|k-1))$ can be equally applied to $\theta(k-1)-h(\hat{m}(k-1|k-2))$ by replacing the time k with time k−1.

At this time, the direction prediction unit 222 predicts a direction of the mobile direction at the predicted position of the mobile body received from the position prediction unit 220 and outputs the predicted direction to the direction error production unit 224.

The direction error production unit 224 subtracts the predicted direction received from the direction prediction unit 222 from the estimated direction received from the direction estimator 2 via an input port IN9 and outputs a result of the subtraction as a direction error value to the position correction unit 226. The position correction unit 226 corrects the predicted position of the mobile body received from the position prediction unit 220 using the direction error value received from the direction error production unit 224 and outputs a result of the correction as a determined position of the mobile body via an output port OUT9. The result of the correction is also output to the time delay unit 228.

The time delay unit 228 delays the result of the correction by the position correction unit 226 and outputs a result of the delay to the position prediction unit 220.

The position correction unit 226 may correct the position of the mobile body predicted by the position prediction unit 220 using the direction error value as shown in Equation 15:

$$m(k|k)=\hat{m}(k|k-1)+K(k)[\theta(k)-h(\hat{m}(k|k-1))] \quad (15)$$

wherein $\theta(k)-h(\hat{m}(k|k-1))$ denotes the direction error value output from the direction error production unit 224, and $h(\hat{m}(k|k-1))$ is $\hat{\theta}(k|k-1)$ $\hat{\theta}(k|k-1)$ is a result obtained by predicting the state of $\theta(k)$ at time k−1, and $\theta(k)$ denotes the estimated direction received from the direction estimator 2 via the input port IN9 and expressed as in Equation 16:

$$\theta(k)=h(m(k))+v(k) \quad (16)$$

wherein $v(k)$ denotes measurement noise, and $h(m(k))$ is expressed as in Equation 17:

$$h(m(k))=a\tan 2(|y_S-y(k)|,|x_S-x(k)|)-\phi(k) \quad (17)$$

wherein $x_s$ and $y_s$ denote positions of the sound source.

$h(\hat{m}(k|k-1))$ in Equation 15 denotes the direction predicted by the direction prediction unit 222, and $K(k)$ denotes a Kalman gain and is calculated using Equation 18:

$$K(k)=\hat{P}(k|k-1)H^T(k)R_e^{-1}(k) \quad (18)$$

wherein T denotes a transpose, and $\hat{P}(k|k-1)$ is calculated using Equation 19:

$$\hat{P}(k|k-1)=F(k)P(k-1|k-1)F^T+Q \quad (19)$$

wherein $F(k)$ denotes the Jacobian of a state model and is calculated using Equation 20:

$$F(k) = \frac{\partial f(u(k))}{\partial m} \quad (20)$$

$P(k|k)$ in Equation 19 is calculated using Equation 21:

$$P(k|k)=\hat{P}(k|k-1)-\hat{P}(k|k-1)H^T(k)R_e^{-1}(k)H(k)\hat{P}(k|k-1) \quad (21)$$

wherein H(k) denotes the Jacobian of a measurement model and is calculated using Equation 22:

$$H(k) = \frac{\partial h(m(k))}{\partial m} \qquad (22)$$

$R_e(k)$ in Equation 21 is calculated using Equation 23:

$$R_e(k) = R + H(k)\hat{P}(k|k-1)H^T(k) \qquad (23)$$

wherein R denotes a measurement noise covariance matrix and is calculated using Equation 24:

$$R = E[v^* v^H] \qquad (24)$$

wherein v denotes measurement noise, H denotes Hermition, and E denotes expectation. Hermition denotes the transposition of a conjugate. Q in Equation 19 denotes a process noise covariance matrix and is calculated using Equation 25:

$$Q = E[w^* w^H] \qquad (25)$$

wherein w denotes process noise.

The position determiner 12A illustrated in FIG. 15 tracks the position m(k) of the mobile body using the direction θ(k) estimated by the direction estimator 2 and the traveling information u(k) produced by the traveling information producer 10 by an extended Kalman filter (EKF). EKF is disclosed in paper entitled "An Introduction to the Kalman Filter," written by Greg Welch and Gary Bishop, and published in Apr. 5, 2004 by Department of Computer Science University of North Carolina at Chapel Hill.

A structure and an operation of the direction estimator 2 of FIG. 1 will now be described in greater detail.

Figure 16:
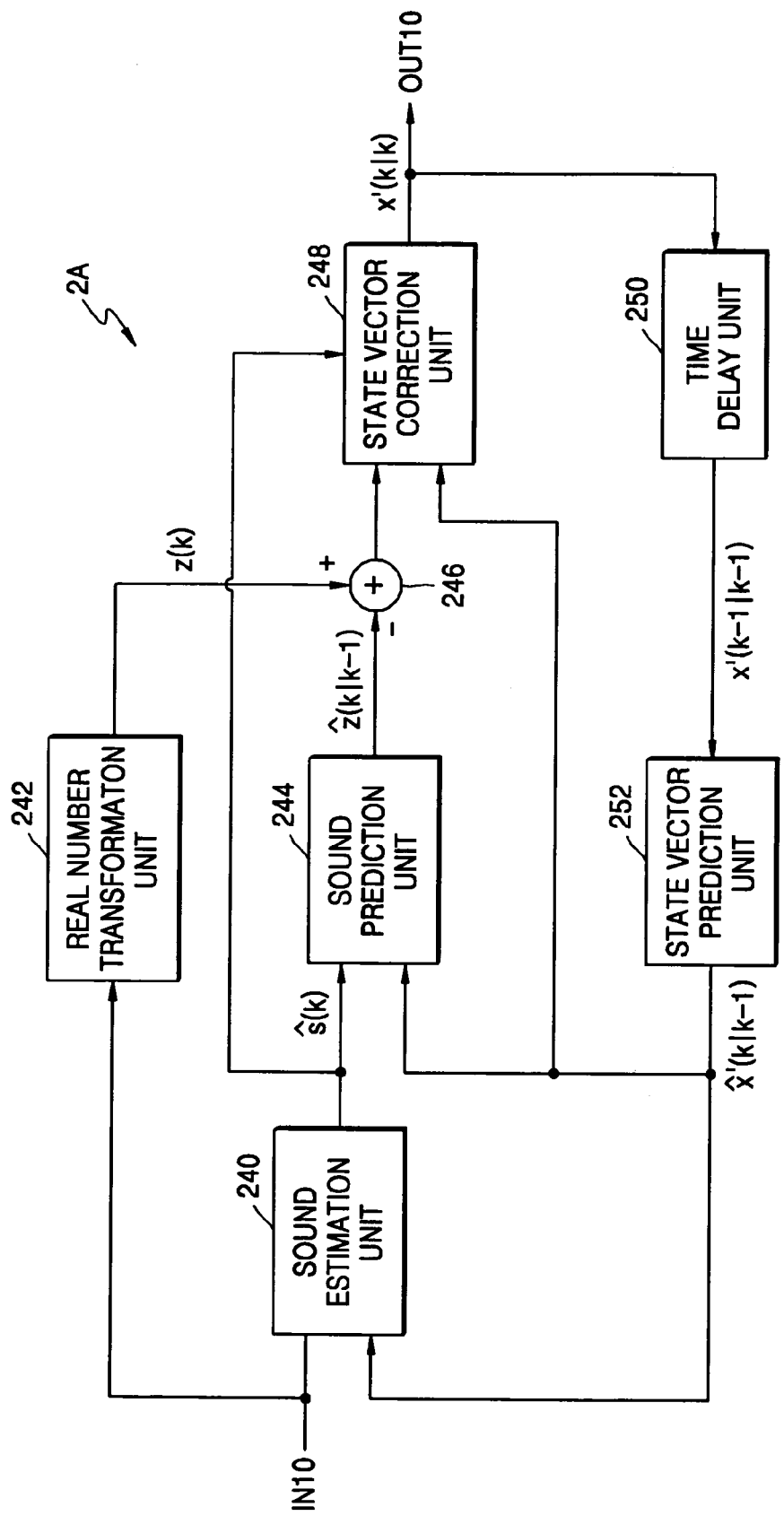
FIG. 16 is a block diagram of an example of the direction estimator of FIG. 1.

FIG. 16 is a block diagram of an example 2a of the direction estimator 2. The direction estimator 2A includes a sound estimation unit 240, a real number transformation unit 242, a sound prediction unit 244, a sound error production unit 246, a state vector correction unit 248, a time delay unit 250, and a state vector prediction unit 252.

The real number transformation unit 242 receives a multi-channel sound expressed as a complex value via an input port IN10, transforms the complex value into a real number, and outputs the real number to the sound error production unit 246. The multi-channel sound denotes a sound received via multiple microphones as shown in FIG. 4B or 4C.

The sound estimation unit 240 estimates a sound using the multi-channel sound expressed as the complex value received via the input port IN10 and a predicted state vector of the mobile body received from the state vector prediction unit 252, and outputs the estimated sound to the sound prediction unit 244. The sound estimation unit 240 may estimate a sound using Equation 26:

$$\hat{s}(k) = (A^H(\hat{\theta}(k|k-1))A(\hat{\theta}(k|k-1)))^{-1}A^H (\hat{\theta}(k|k-1))z_{array}(kT) \qquad (26)$$

wherein $\hat{s}(k)$ denotes the sound estimated by the sound estimation unit 240, and A(θ(t)) is calculated using Equation 27:

$$A((\theta(t)) = [a(\theta(t))] \qquad (27)$$

wherein 'a' denotes a steering vector, and a(θ(t)) for a far-field narrowband sound signal received via the multiple microphones arranged as illustrated in FIG. 4C is calculated using Equation 28:

$$a(\theta(t)) = \left[1, \exp\left(-j2\pi\frac{d}{\lambda}\sin(\theta(t))\right), \ldots, \exp\left(-j2(p-1)\pi\frac{d}{\lambda}\sin(\theta(t))\right)\right]^T \qquad (28)$$

wherein d denotes an interval between adjacent microphones, λ denotes a wavelength of a sound source, p denotes the number of multiple microphones installed on a mobile body. In FIG. 4C, p is equal to 8.

In Equation 26, $z_{array}(kT)$ denotes a multi-channel sound expressed as a complex value received via an input port IN11, and T denotes a sampling time.

The sound prediction unit 244 predicts a sound using the sound estimated by the sound estimation unit 240 and the state vector predicted by the state vector prediction unit 252 and outputs the predicted sound to the sound error production unit 246. The sound prediction unit 244 may predict a sound as in Equation 29:

$$\hat{z}(k|k-1) = h(\hat{x}'(k|k-1), \hat{s}(k)) = \begin{bmatrix} \text{Real}\{A(\hat{\theta}(k|k-1))\hat{s}(k)\} \\ \text{Image}\{A(\hat{\theta}(k|k-1))\hat{s}(k)\} \end{bmatrix} \qquad (29)$$

wherein $\hat{z}(k|k-1)$, which is a sound predicted by the sound prediction unit 244, denotes a result obtained by predicting the state of z(k) at time k−1, and z(k) may be calculated using Equation 30:

$$z(k) = \begin{bmatrix} \text{Real}(z_{array}(t)) \\ \text{Image}(z_{array}(t)) \end{bmatrix}_{t=kT} \qquad (30)$$
$$= A(\theta(k))s(k) + n(k)$$

wherein s(t) denotes a sound generated from a sound source, Real{i} denotes a real number of i, Image{i} denotes an imaginary number of i, and n(t) denotes measurement noise and may be expressed as in Equation 31:

$$n(t) = [n_1(t), n_2(t), *** , n_p(t)]^T \qquad (31)$$

$\hat{x}'(k|k-1)$ in Equation 29 is a state vector predicted by the state vector prediction unit 252 and denotes a state of x'(k) at time k−1, and x'(k) may be expressed as in Equation 32:

$$x'(k) = \left[\theta(k), \frac{d\theta(k)}{dk}\right] \qquad (32)$$
$$= F'x'(k-1) + G'w'(k)$$

wherein F' and G' are equal to Equations 33 and 34, respectively:

$$F' = \begin{bmatrix} 1 & T \\ 0 & 1 \end{bmatrix} \qquad (33)$$

$$G' = \begin{bmatrix} \frac{1}{2}T^2 & 0 \\ 0 & T \end{bmatrix} \quad (34)$$

The sound error production unit 246 subtracts the sound predicted by the sound prediction unit 244 from a result of the transformation by the real number transformation unit 242 and outputs a result of the subtraction as a sound error value to the state vector correction unit 248.

The state vector correction unit 248 corrects the predicted state vector of the mobile body received from the state vector prediction unit 252 using the sound error value received from the sound error production unit 246 and the estimated sound ŝ(k) received from the sound estimation unit 240 and outputs the estimated direction from a result of the correction via an output port OUT10. The state vector correction unit 248 outputs the result of the correction to the time delay unit 250. The state vector correction unit 248 may correct the predicted state vector as shown in Equation 35:

$$x'(k|k) = \hat{x}'(k|k-1) + K'(k)[z(k) - \hat{z}(k|k-1)] \quad (35)$$

wherein x'(k|k) denotes the state vector corrected by the state vector correction unit 248, z(k)−ẑ(k|k−1) denotes the sound error value produced by the sound error production unit 246, and K'(k) denotes a Kalman gain and is calculated using Equation 36:

$$K'(k) = \hat{P}'(k|k-1)H'^T(k,\hat{s}(k))R'^{-1}_e(k) \quad (36)$$

wherein $\hat{P}'(k|k-1)$ is calculated using Equation 37:

$$\hat{P}'(k|k-1) = F'P'(k-1|k-1)F'^T + G'Q'G'^T \quad (37)$$

wherein Q' denotes a process noise covariance matrix and may be expressed as in Equation 38, and P'(k|k) is equal to Equation 39:

$$Q' = E[w'(k) \times w'^T(k)] \quad (38)$$

$$P'(k|k) = \hat{P}'(k|k-1) - \hat{P}'(k|k-1)H'^T(k,\hat{s}(k))R'^{-1}_e(k)H'(k,\hat{s}(k))\hat{P}'(k|k-1) \quad (39)$$

H'(k, ŝ(k)) in Equation 36 is equal to Equation 40: (40)

$$H'(k,\hat{s}(k)) = \begin{bmatrix} \text{Real}\left(\frac{\partial}{\partial x'}(A(\theta(k))\hat{s}(k))\right) \\ \text{Image}\left(\frac{\partial}{\partial x'}(A(\theta(k))\hat{s}(k))\right) \end{bmatrix}$$

$$= \begin{bmatrix} 0 & 0 \\ s_{(1,1)} & 0 \\ \vdots & \vdots \\ s_{(1,p-1)} & 0 \\ 0 & 0 \\ c_{(1,1)} & 0 \\ \vdots & \vdots \\ c_{(1,p-1)} & 0 \end{bmatrix}$$

wherein p denotes the number of microphones when the multiple microphones line up as shown in FIG. 4C. Here, $s_{(1,b)}$ (1≦b≦p) and $c_{(1,b)}$ may be expressed as in Equations 41 and 42, respectively:

$$s_{(1,b)} = -\sin(\pi b \sin(\theta(k)))\cos(\theta(k))\hat{s}(k) \quad (41)$$

$$c_{(1,b)} = -\cos(\pi b \sin(\theta(k)))\cos(\theta(k))\hat{s}(k) \quad (42)$$

R'_e(k) in Equation 39 may be expressed as in Equation 43:

$$R'_e(k) = R' + H'(k,\hat{s}(k))\hat{P}'(k|k-1)H'^T(k,\hat{s}(k)) \quad (43)$$

wherein R' denotes a measurement noise covariance matrix and may be expressed as in Equation 44:

$$R' = E[n(k) \times n^T(k)] \quad (44)$$

$\hat{x}'(k|k-1)$ in Equation 35 may be expressed as in Equation 45:

$$\hat{x}'(k|k-1) = F'x'(k-1|k-1) \quad (45)$$

The time delay unit 250 delays the result of the correction by the state vector correction unit 248 and outputs a result of the delay to the state vector prediction unit 252. The state vector prediction unit 252 predicts a state vector using the result of the delay by the time delay unit 250 and outputs the predicted state vector to the sound estimation unit 240, the sound prediction unit 244, and the state vector correction unit 248.

The above-described embodiments of the present invention can be implemented as computer-readable code stored on a computer-readable storage medium. Examples of such computer-readable storage media include various kinds of recording devices for storing data to be read by a computer system, such as ROM, RAM, CD-ROM, magnetic tape, floppy disk, and optical data storage device. A medium implemented in a form of a carrier wave (e.g., a transmission over Internet) is another example of the computer-readable storage medium. Further, the computer-readable storage medium can be distributed in a computer system connected over a network, and the computer-readable code is recorded and implemented in a distributed manner.

According to the above-described embodiments, a mobile body controlling method and apparatus does not need to transmit a synchronous signal and does not need an extra distance-measuring sensor in contrast with a conventional mobile body controlling apparatus. Also, the mobile body controlling method and apparatus according to the above-described embodiments can perform the following operations of: determining a distance between a mobile body and a sound source using only a direction of the mobile body with respect to the sound source and information about the travelling of the mobile body; moving the mobile body toward the sound source using the determined distance between the mobile body and the sound source and the direction of the mobile body with respect to the sound source; correcting a distance between a consecutively travelling mobile body and a sound source and/or a direction of the mobile body with respect to the sound source; and ascertaining a position of the mobile body using the direction of the mobile body with respect to the sound source and information about the travelling of the mobile body.

Particularly, the mobile body controlling method and apparatus according to the above-described embodiments are suitable for controlling mobile bodies in which it is difficult to install a sensor (e.g., a camera or a laser), such as, a cleaning robot, a small toy robot, etc. In addition, the mobile body can be controlled to travel toward the sound source, so that the sound source and the mobile body can be easily docked with each other. Furthermore, the mobile body controlling method and apparatus according to the above-described embodiments of the present invention can be used to move the mobile body toward the sound source when the sound source calls the mobile body.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for controlling a mobile body that travels around a sound source which generates a sound, the apparatus comprising:
    a direction estimator estimating a direction in which the mobile body is located in a first position and a direction in which the mobile body is located in a second position with respect to the sound source;
    a traveling information producer producing traveling information about traveling of the mobile body from the first position to the second position;
    a traveling direction determiner determining a traveling direction of the mobile body using the estimated direction in the first position;
    a traveling controller moving the mobile body a predetermined distance to the second position in the determined traveling direction; and
    a position determiner determining a position of the mobile body using the traveling information and the estimated directions in the first and second positions.

2. The apparatus of claim 1, wherein the position of the mobile body includes a distance between the mobile body and the sound source, the distance being determined using the traveling information and the estimated direction.

3. The apparatus of claim 2, wherein the position determiner calculates the distance between the mobile body and the sound source using the following equation:

$$l_2 = l \times \frac{\sin(\theta_1'')}{\sin(\theta_2'' - \theta_1'')},$$

and
    wherein l denotes a distance by which the mobile body travels from the first position to the second position and is included in the traveling information, $l_2$ denotes a distance between the second position to which the mobile body has traveled and the sound source, and $\theta_1''$ and $\theta_2''$ denotes directions of the mobile body estimated by the direction estimator when the mobile body is located at the first and second positions with respect to the sound source.

4. The apparatus of claim 2, when the mobile body continuously travels from the first position to the second position, further comprising a position corrector correcting the distance between the second position to which the mobile body is moved and the sound source or the estimated direction of the mobile body that has reached the second position using a power distribution of the sound and a triangonometry,
    wherein the position of the mobile body includes the distance or the estimated direction.

5. The apparatus of claim 4, when the position corrector comprises:
    a real position search unit searching for a real position for the determined position of the mobile body on a path between a third position where the direction of the mobile body starts being estimated and a second position where the estimation of the direction of the mobile body ends, using the power distribution of the sound;
    a distance error calculation unit calculating a distance between the real position and the second position and outputting the distance as a distance error;
    a distance calculation unit calculating a distance between the real position and the sound source by triangonometry using a result obtained by subtracting the distance error from the traveling distance between the first and second positions, the direction of the mobile body located at the first position, and the estimated direction of the mobile body located at the second position;
    a distance correction unit correcting the distance calculated by the distance calculation unit using the distance error calculated by the distance error calculation unit and the estimated direction of the mobile body at the second position; and
    a direction correction unit correcting the estimated direction of the mobile body located at the second position using a ratio between the corrected distance and the calculated distance.

6. The apparatus of claim 4, when the real position a position on the path between the third and second positions where the sound power satisfies the following equation:

$$\frac{\sum_{n=N-N_2+1}^{N} P(n)}{\frac{1}{N}\sum_{n=1}^{N} P(n)} = 0.5$$

, and
    wherein N denotes a number of frames existing between the third and second positions and is $N_1+N_2$, $N_1$ denotes a number of frames existing between the third position and the real position, $N_2$ denotes a number of frames existing between the second position and the real position, and P(n) denotes a power of each of the frames.

7. The apparatus of claim 5, when the distance error calculation unit calculates the distance error using the following equation:

$$l_{N2} = \frac{N_2}{N} l_N,$$

and
    wherein $l_N$ denotes a distance between the third and second positions by which the mobile body travels, and $l_{N2}$ denotes the distance error.

8. The apparatus of claim 5, wherein:
    the distance calculation unit calculates the distance between the real position and the sound source using the following equation:

$$l_2' = (l - l_{N2})\frac{\sin\theta_1''}{\sin(\theta_2'' - \theta_1'')}$$

in which $l_2'$ denotes the distance between the real position and the sound source, l denotes a traveling distance between the first and second positions, $l_{N2}$ denotes the distance error, $\theta_2''$ denotes the estimated direction of the mobile body located at the first position, and $\theta'''_2$ denotes the direction of the mobile body estimated at the second position;

the distance correction unit corrects the distance calculated by the distance calculation unit using the following equation:

$$l_2 = \sqrt{l_{N_2}^2 + l'^2_2 - 2l_{N_2}l'_2\cos(\theta''_2)}$$

in which $l_2$ denotes the corrected distance; and the direction correction unit corrects the estimated direction of the mobile body using the following equation:

$$\theta''_2 = \operatorname{asin}\left(\sin(\theta'''_2)\frac{l'_2}{l_2}\right)$$

in which $\theta''_2$ denotes the corrected direction.

9. The apparatus of claim 1, further comprising a sound detector determining whether a predetermined sound has been detected and outputting a result of the determination as a sound detection signal, wherein the direction estimator estimates the direction of the mobile body in response to the sound detection signal.

10. The apparatus of claim 9, wherein the sound detector comprises:

a noise removal unit removing noise from the generated sound;

a component extraction unit extracting a signal component at a level at least equal to a predetermined level from a result of the noise removal; and a sound recognition unit determining whether the extracted signal component is the predetermined sound and outputting a result of the determination as the sound detection signal.

11. The apparatus of claim 9, wherein the sound detector comprises:

a band pass filter filtering a predetermined band component from the generated sound;

an envelope detection unit detecting an envelope corresponding to a result of the filtering; and a level comparison unit comparing a level of the detected envelope with a critical level and outputting a result of the comparison as the sound detection signal.

12. The apparatus of claim 9, wherein the sound detector comprises:

a first band pass filter filtering a first predetermined band component out of the generated sound;

a second band pass filter filtering a second predetermined band component out of the generated sound;

a first envelope detection unit detecting an envelope of a result of the band pass filtering by the first band pass filter;

a second envelope detection unit detecting an envelope of a result of the band pass filtering by the second band pass filter;

a first level comparison unit comparing a level of the envelope detected by the first envelope detection unit with a first critical level;

a second level comparison unit comparing a level of the envelope detected by the second envelope detection unit with a second critical level; and a level recognition unit determining whether the first and second predetermined band components are alternately detected using the results of the comparisons by the first and second level comparison units and outputting a result of the determination as the sound detection signal.

13. The apparatus of claim 1, wherein the traveling controller moves the mobile body toward the sound source using the estimated direction and the determined distance.

14. The apparatus of claim 1, further comprising a comparator comparing the determined distance with a critical value, wherein the traveling direction determiner renews the traveling direction in response to a result of the comparison by the comparator.

15. The apparatus of claim 1, wherein the position determiner predicts a current position of the mobile body using the traveling information, corrects the predicted current position using the estimated direction, and outputs a result of the correction as the determined position of the mobile body.

16. The apparatus of claim 15, wherein the position determiner comprises:

a direction prediction unit predicting a direction of the mobile body from the predicted position of the mobile body and outputting the predicted direction of the mobile body;

a direction error production unit subtracting the predicted direction from the estimated direction and outputting a result of the subtraction as a direction error value;

a position correction unit correcting the predicted position of the mobile body using the direction error value and outputting a result of the correction as the determined position of the mobile body;

a time delay unit delaying the result of the correction; and a position prediction unit predicting the position of the mobile body from the result of the delay and the traveling information.

17. The apparatus of claim 16, wherein the traveling information is at least one of a traveling velocity of the mobile body, a directional angular velocity of the mobile body, and a traveling distance of the mobile body.

18. The apparatus of claim 17, wherein the position correction unit corrects the predicted position of the mobile body using the direction error value defined by the following equation:

$$m(k|k)=\hat{m}(k|k-1)+K(k)[\theta(k)-h(\hat{m}(k|k-1))]$$

in which $m(k|k)$ denotes a result obtained by estimating the state of $m(k)$ at current time $k$, $m(k)$ denotes a determined position of the mobile body at current time $k$, $\hat{m}(k|k-1)$ denotes the predicted position of the mobile body, $\theta(k)-h(\hat{m}(k|k-1))$ denotes the direction error value, $\theta(k)$ denotes the estimated direction of the mobile body, $h(\hat{m}(k|k-1))$ denotes the predicted direction of the mobile body, $K(k)$ denotes a Kalman gain and is defined by:

$$K(k)=\hat{P}(k|k-1)H^T(k)R_e^{-1}(k), \hat{P}(k|k-1)$$

is equal to $FP(k-1|k-1)F^T+Q$, $F(k)$ is defined by:

$$F(k) = \frac{\partial f(u(k))}{\partial m}, u(k)$$

denotes the traveling information, $P(k|k)$ is defined by:

$$P(k|k)=\hat{P}(k|k-1)-\hat{P}(k|k-1)H^T(k)R_e^{-}(k)H(k)\hat{P}(k|k-1), _T$$

denotes a transpose, $Q$ denotes a process noise covariance matrix and is defined by:

$$Q=E[w*w^H],$$

w denotes process noise, H(k) is defined by:

$$H(k) = \frac{\partial h(m(k))}{\partial m},$$

$R_e(k)$ is defined by:

$$R_e(k) = R + H(k)\hat{P}(k|k-1)H^T(k),$$

R denotes a measurement noise covariance matrix and is given by: $R = E[v^* v^H]$, and v denotes measurement noise.

19. The apparatus of claim 1, wherein the direction estimator comprises:
  a real number transformation unit receiving a multi-channel sound expressed as a complex value and transforming the complex value into a real number;
  a sound estimation unit estimating the sound using the multi-channel sound expressed as the complex value and a predicted state vector of the mobile body;
  a sound prediction unit predicting the sound using the sound estimated by the sound estimation unit and the predicted state vector of the mobile body;
  a sound error production unit subtracting the sound predicted by the sound prediction unit from a result of the transformation by the real number transformation unit and outputting a result of the subtraction as a sound error value;
  a state vector correction unit correcting the predicted state vector of the mobile body using the sound error value and the estimated sound received from the sound estimation unit and outputting the estimated direction of the mobile body from a result of the correction;
  a time delay unit delaying the result of the correction; and
  a state vector prediction unit predicting the state vector using the result of the delay and outputting the predicted state vector.

20. The apparatus of claim 19, wherein:
  the sound estimation unit estimates the sound using the following equation:

$$\hat{s}(k) = (A^H(\hat{\theta}(k|k-1))A(\hat{\theta}(k|k-1)))^{-1}A^H(\hat{\theta}(k|k-1))z_{array}(kT)$$

in which $\hat{s}(k)$ denotes the sound estimated by the sound estimation unit, $A(\theta(t))$ is given by: $A((\theta(t)) = [a(\theta(t))]$, a denotes a steering vector, H denotes Hermition, $z_{array}(kT)$ denotes the multi-channel sound expressed as a complex value, and T denotes a sampling time;
  the sound prediction unit predicts the sound using the following equation:

$$\hat{z}(k|k-1) = h(\hat{x}'(k|k-1), \hat{s}(k)) = \begin{bmatrix} \text{Real}\{A(\hat{\theta}(k|k-1))\hat{s}(k)\} \\ \text{Image}\{A(\hat{\theta}(k|k-1))\hat{s}(k)\} \end{bmatrix}$$

in which $\hat{x}'(k|k-1)$ is the predicted state vector, x'(k) denotes a state vector and is equal to $$\begin{bmatrix} \theta(k), \dfrac{d\theta(k)}{dk} \end{bmatrix}, \hat{z}(k|k-1)$$

is the predicted sound, z(kT) is equal to $$\begin{bmatrix} \text{Real } (z_{array}(kT)) \\ \text{Image } (z_{array}(kT)) \end{bmatrix},$$

Real{i} denotes a real number of i, Image{i} denotes an imaginary number of 1; and
  the state vector correction unit corrects the predicted state vector using the following equation:

$$x'(k|k) = \hat{x}'(k|k-1) + K'(k)[z(k) - \hat{z}(k|k-1)]$$

in which x'(k|k) denotes the state vector corrected by the state vector correction unit, $z(k) - \hat{z}(k|k-1)$ denotes the sound error value produced by the sound error production unit, K'(k) denotes a Kalman gain and is defined by:

$$K'(k) = \hat{P}'(k|k-1)H'^T(k,\hat{s}(k))R'^{-1}_e(k), \hat{P}'(k|k-1)$$

is defined by:

$$\hat{P}'(k|k-1) = F'P'(k-1|k-1)F'^T + G'Q'G'^T,$$

F' is given by:

$$F' = \begin{bmatrix} 1 & T \\ 0 & 1 \end{bmatrix}, G'$$

is given by:

$$G' = \begin{bmatrix} \dfrac{1}{2}T^2 & 0 \\ 0 & T \end{bmatrix}, P'(k|k)$$

is defined by $$P'(k|k) = \hat{P}'(k|k-1) - \hat{P}'(k|k-1)H'^T(k,\hat{s}(k))R'^{-1}_e(k)H'(k,\hat{s}(k))\hat{P}'(k|k-1)$$

by:

$$H'(k, \hat{s}(k))$$

is equal to $$\begin{bmatrix} \text{Real}\left(\dfrac{\partial}{\partial x'}(A(\theta(k))\hat{s}(k))\right) \\ \text{Image}\left(\dfrac{\partial}{\partial x'}(A(\theta(k))\hat{s}(k))\right) \end{bmatrix},$$

$R'_e(k)$ is defined by:

$$R'_e(k) = R' + H'(k,\hat{s}(k))\hat{P}'(k|k-1)H'^T(k,\hat{s}(k))$$

21. A method of controlling a mobile body that travels around a sound source which generates a sound, comprising:
  estimating a direction in which the mobile body is located in a first position with respect to the sound source;
  determining a traveling direction of the mobile body using the estimated direction of the mobile body;
  moving the mobile body a predetermined distance to a second position in the determined travelling direction;
  producing traveling information about the traveling of the mobile body;

estimating a direction in which the mobile body is located in the second position with respect to the sound source after the mobile body has moved; and determining a position of the mobile body using the traveling information and the estimated directions in the first and second positions.

22. The method of claim 21, wherein the determined position includes a distance between the mobile body and the sound source determined using the traveling information and the estimated directions.

23. The method of claim 21, further comprising:

determining whether a predetermined sound has been detected and proceeding to the operation of estimating the direction of the mobile body when it is determined that the predetermined sound has been detected; and after performing the operation of producing the traveling information, determining whether the predetermined sound has been detected and proceeding to the operation of estimating the direction of the moved mobile body when it is determined that the predetermined sound has been detected.

24. The method of claim 21, further comprising moving the mobile body toward the sound source using the estimated direction and the determined distance.

25. The method of claim 21, further comprising:

determining whether the determined distance is smaller than a critical value; and renewing the traveling direction using the estimated direction and proceeding to the operation of moving the mobile body by the predetermined distance, when it is determined that the determined distance is at least equal to the critical value.

26. The method of claim 21, when the mobile body continuously travels to the second position from the first position, further comprising correcting the distance between the mobile body at the second position and the sound source or the estimated direction of the mobile body traveled to the second position using a power distribution of the sound and a triangonometry.

27. The method of claim 26, wherein the correcting comprises:

searching for a real position for the predetermined position of the mobile body on a path between a third position, where a direction of the mobile body starts being estimated, and the second position, where the estimation of the direction of the mobile body ends, using the power distribution of the sound;

calculating a distance between the real position and the second position and determining the distance as a distance error;

calculating a distance between the real position and the sound source by triangonometry using a result obtained by subtracting the distance error from the traveling distance between the first and second positions, the estimated direction of the mobile body at the first position, and the estimated direction of the mobile body moved at the second position;

correcting the determined distance using the calculated distance between the real position and the sound source, the distance error, and the estimated direction of the mobile body traveled to the second position; and correcting the estimated direction of the mobile body located at the second position using a ratio between the corrected distance and the calculated distance, wherein the position of the mobile body includes at least one of the distance and the estimated direction.

28. The method of claim 21, wherein the determining of the position of the mobile body comprises predicting a current position of the mobile body using the traveling information, correcting the predicted current position using the estimated direction, and determining the corrected position as the position of the mobile body.

29. A computer-readable storage medium encoded with processing instructions for causing a processor to perform a method of controlling a mobile body that travels around a sound source which generates a sound, the method comprising:

estimating a direction in which the mobile body is located in a first position with respect to the sound source determining a traveling direction of the mobile body using the estimated direction of the mobile body;

moving the mobile body a predetermined distance to a second position in the determined travelling direction;

producing traveling information about the traveling of the mobile body;

estimating a direction in which the mobile body is located in the second position with respect to the sound source after the mobile body has moved; and determining a position of the mobile body using the traveling information and the estimated directions in the first and second positions.

* * * * *